US008812824B2

(12) United States Patent
Gschwind

(10) Patent No.: US 8,812,824 B2
(45) Date of Patent: Aug. 19, 2014

(54) METHOD AND APPARATUS FOR EMPLOYING MULTI-BIT REGISTER FILE CELLS AND SMT THREAD GROUPS

(75) Inventor: Michael Gschwind, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 1898 days.

(21) Appl. No.: 11/762,137

(22) Filed: Jun. 13, 2007

(65) Prior Publication Data

US 2008/0313437 A1    Dec. 18, 2008

(51) Int. Cl.
G06F 9/312    (2006.01)
(52) U.S. Cl.
USPC .......................................... 712/225; 712/14
(58) Field of Classification Search
None
See application file for complete search history.

(56) References Cited

U.S. PATENT DOCUMENTS

| | | | |
|---|---|---|---|
| 4,276,488 A | 6/1981 | Benedict et al. | |
| 4,879,680 A | 11/1989 | Luckett et al. | |
| 5,345,588 A | 9/1994 | Greenwood et al. | |
| 5,778,243 A | 7/1998 | Aipperspach et al. | |
| 5,813,037 A | 9/1998 | Martell et al. | |
| 6,038,166 A | 3/2000 | Wong | |
| 6,378,065 B1 | 4/2002 | Arnold et al. | |
| 6,462,986 B1 | 10/2002 | Khan | |
| 6,629,236 B1 | 9/2003 | Aipperspach et al. | |
| 6,657,913 B2 | 12/2003 | Abedifard et al. | |
| 7,085,153 B2 | 8/2006 | Ferrant et al. | |
| 7,178,008 B2* | 2/2007 | Hironaka et al. | 712/215 |
| 7,634,621 B1* | 12/2009 | Coon et al. | 711/149 |
| 2009/0222625 A1* | 9/2009 | Ghosh et al. | 711/130 |

OTHER PUBLICATIONS

Examiner's Final Action in the application file of Aipperspach et al. (Publication No. 2003/0200424) dated Sep. 20, 2006.*
Borkenhagen et al., "A Multithreaded PowerPC Processor for Commercial Servers", IBM J Res. Develop, vol. 44, No. 6 Nov. 2000; pp. 885-898.
B. Shinharoy et al., "POWER% System Microarchitecture", IBM J Res & Dev., vol. 49, No. 4/5, Jul./Sep. 2005; pp. 505-521.
T. N. Butt et al., Organization and Implementation of Register-Renaming Mapper for Out-of-Order IBM POWER4 Processors; IBM J Res. & Dev., vol. 49, No. 1, Jan. 2005; pp. 167-188.
Gschwind, "Register Map Unit Supporting Map of Multiple Register Specifier Classes", Unpublished US Application filed Jan. 3, 2007, U.S. Appl. No. 11/619,248.

* cited by examiner

*Primary Examiner* — Aimee Li
(74) *Attorney, Agent, or Firm* — Tutunjian & Bitetto, P.C.; William Stock

(57) ABSTRACT

There are provided methods and apparatus for multi-bit cell and SMT thread groups. An apparatus for a register file includes a plurality of multi-bit storage cells for storing a plurality of bits respectively corresponding to a plurality of threads. The apparatus further includes a plurality of port groups, operatively coupled to the plurality of multi-bit storage cells, responsive to physical register identifiers. The plurality of port groups is responsive to respective ones of a plurality of thread identifiers. Each of the plurality of thread identifiers are for uniquely identifying a particular thread from among a plurality of threads.

20 Claims, 19 Drawing Sheets

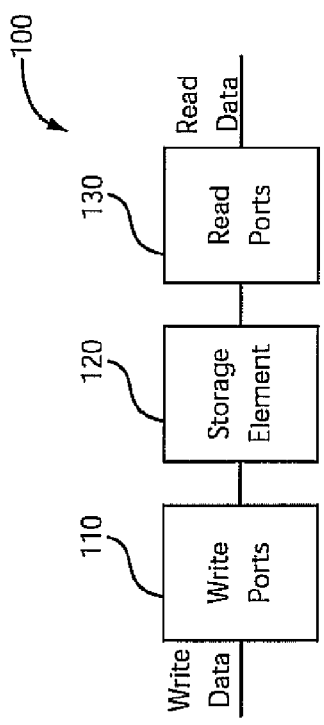
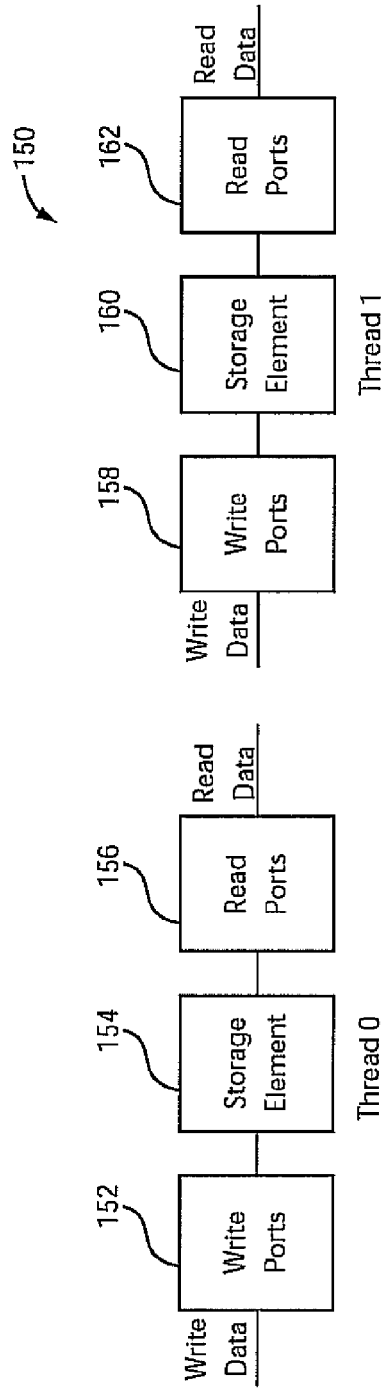

METHOD AND APPARATUS FOR EMPLOYING MULTI-BIT REGISTER FILE CELLS AND SMT THREAD GROUPS

BACKGROUND

1. Technical Field

The present invention generally relates to register files, and more particularly, to methods and apparatus for employing multi-bit register file cells for simultaneous multi-threading (SMT) thread groups. Moreover, method and apparatus are provided for generating specifiers based on thread groups for use with the preceding methods and apparatus, in microprocessors with and without register renaming.

2. Description of the Related Art

Microprocessor technology has relied aggressively on the use of instruction-level parallelism (ILP) techniques, in the form of deep pipelining and parallel superscalar instruction issue to increase the performance of microprocessor systems. Typically, additional mechanisms such as out-of-order execution and register renaming are also supplied in many implementations to further increase the performance of microprocessors and exploit the ILP potential offered by deep pipelining and wide superscalar issue capability.

However, despite the gains seen using these additional techniques such as out-of-order execution and register renaming, the execution capabilities made available by ILP techniques such as deep pipelining and parallel superscalar issue far exceed the gains seen by any single application thread, leaving a large number of resources unused.

To better utilize the resources available in a high ILP processor, hardware-based multithreading schemes were introduced. For example, in one prior art hardware-based multi-threading scheme, two hardware threads can be alternated to cover long latency events in threads, such as caches misses.

A more advanced hardware-multithreading scheme is simultaneous multithreading (SMT), as implemented by the IBM POWER5 microprocessor, and described by Sinharoy et el. in "POWER5 SYSTEM MICROARCHITECTURE", IBM Journal of Research and Development, Vol. 49, Issue 4/5, July, 2005 (hereinafter referred to as "Sinharoy"), the disclosure of which is incorporated by reference herein. In SMT-based implementations, instructions from multiple threads can be issued simultaneously.

Thus, hardware-based multi-threading has become an important performance enhancer for microprocessors by exploiting underutilized resources. While supporting multiple threads is advantageous, it also requires a significant increase in the state storage of microprocessors, to hold register values and remap tables for a plurality of threads. This increase in resources causes increased latencies, and area increases in a microprocessor design.

Turning to FIG. 1A, a register file 100 in accordance with the prior art is indicated by the reference numeral 100. The register file 100 includes write ports 110, at least one storage element 120, and read ports 130. In one embodiment of a microprocessor with hardware-based multi-threading, this structure is used to support more than one thread by increasing the number of storage elements, while maintaining the architecture of read and write ports.

Turning to FIG. 1B, a two-threaded storage array of conventional storage cells for supporting multiple threads, in accordance with the prior art, is indicated generally by the reference numeral 150. It is to be appreciated that while some of the elements of FIG. 1B, as well as other figures herein, are described as set while showing only one member, it is to be appreciated that such a set may have more than one member, while maintaining the spirit of the present principles.

The two-threaded storage array 150 includes a first set of write ports 152, a first set of storage elements 154, and a first set of read ports 156, used to store and access data corresponding to a first thread (thread 0).

The two-threaded storage array 150 also includes a second set of read ports 158, a second set of storage elements 160, and a second set of read ports 162, used to store and access data corresponding to a second thread (thread 1).

Turning to FIG. 2, an arrangement of six read ports for a register file, in accordance with the prior art, is indicated generally by the reference numeral 200.

The arrangement of read ports 200 corresponds to one implementation of register file 100 shown in FIG. 1A. A plurality of bit (storage) cells 210 corresponding to a bit position (shown as bit 0 in exemplary fashion) of registers R00 to R31 are connected to read-multiplexers 220 of read ports (6 read ports shown in exemplary fashion), each being implemented with selection logic 230 to select data from the plurality of bit cells 210. This design is flexible, and allows each read port to select any register file for a read, but leads to significant wiring needs which increase the register file area.

Turning to FIG. 3, a register rename architecture for multiple threads for use in conjunction with a hardware multi-threaded microprocessor, in accordance with the prior art, is indicated generally by the reference numeral 300. Thread number 310 and instruction-specified register number 320 are used to rename a specific register with register mapper 330 to any of a plurality of physical registers in a unified physical register file 340, wherein all threads can be allocated to a given register. A set of read ports 350 is used to select for each renamed register the specified physical register based on renaming by mapper 340 from any of the registers in the unified physical register file.

It will be understood that the phrase "unified physical register file" as used herein describes the unified architecture with respect to storing data from multiple threads, and not to ISA characteristics, such as whether a specific architecture supports separate register files for different data types.

One prior art approach involves a multi-thread memory for a microprocessor, wherein the memory uses a write-in interface and reading interface of multi-thread memory cell to select among contents of thread correspondence inside a register cell, based on thread that is identified to correspond at least partially.

Turning to FIG. 4, a two-threaded storage cell with a multi-threaded read port, in accordance with the prior art, is indicated generally by the reference numeral 400. In accordance with the design of FIG. 4, storage cells have independent write ports 402 and 406 for writing to two storage elements 404 and 408 that store respective data for a first and a second thread. Thread select logic 410 selects between storage elements corresponding to a first and second thread, and provides the data to a group of read ports 414.

Advantageously, this design reduces the number of routing resources required by requiring only one signal wire for two storage cells under the control of thread select logic 410. However, this design also disadvantageously limits the read ports such that all reads correspond to a single thread. While this has not been a limitation for all prior art microprocessors with hardware multi-threading, this type of design optimization has not been applicable to simultaneous multiprocessor systems, wherein a first instruction may read from a storage element 404 and a second instruction may require data read access to data in storage element 408. Disadvantageously, this design can also not be used in conjunction with traditional register renaming architectures, such as those in accordance with FIG. 3.

Turning to FIG. 5A, a method for generating register file addresses in a processor with hardware-multi-threading that does not implement register renaming and in conjunction with a conventional register file, in accordance with the prior art, is indicated generally by the reference numeral 500. The method starts with step 510.

In step 510, a thread identifier is used in conjunction with a per-thread register number to generate a processor-wide unique register number, and control is passed to step 520. In accordance with one implementation of this step, concatenation of the thread identifier and register specifiers is performed, as expressed by the following VHDL:

FRA_ADDR<=TID & FRA_FIELD;
FRB_ADDR<=TID & FRB_FIELD;
FRC_ADDR<=TID & FRC_FIELD;
FRT_ADDR<=TID & FRT_FIELD;

In the example, and in accordance with an exemplary implementation of the Power Architecture, the FRA_FIELD, FRB_FIELD, FRC_FIELD, FRT_FIELD variables correspond to the per-thread fields extracted from exemplary 5 bit operand fields in the instruction word, or microcode ROM, or generated by instruction cracking, or otherwise obtained. The thread identifier (TID) variable furthermore corresponds to the currently active thread's thread ID, e.g., an exemplary 2 bit vector, and the FRA_ADDR, FRB_ADDR, FRC_ADDR, and FRT_ADDR vectors are 7 bit vectors uniquely specifying an entry in a 128 entry register file.

In step 520, the processor-wide register number is used to perform a read access from and/or a write access to a register file capable of storing registers for a plurality of threads, and the method is terminated.

Turning to FIG. 5B, a method for generating register file addresses in a processor with hardware-multi-threading that implements register renaming and in conjunction with a conventional register file, in accordance with the prior art, is indicated generally by the reference numeral 550. The method 550 starts with step 560.

In step 560, a thread identifier is used in conjunction with a per-thread register number to generate a processor-wide unique register number, and control is passed to step 570. In accordance with one implementation of this step, concatenation of the thread identifier and register specifiers is performed, as expressed by the following VHDL:

FRA_ADDR<=TID & FRA_FIELD;
FRB_ADDR<=TID & FRB_FIELD;
FRC_ADDR<=TID & FRC_FIELD;
FRT_ADDR<=TID & FRT_FIELD;

In the example, and in accordance with an exemplary implementation of the Power Architecture, the FRA_FIELD, FRB_FIELD, FRC_FIELD, FRT_FIELD variables correspond to the per-thread fields extracted from exemplary 5 bit operand fields in the instruction word, or microcode ROM, or generated by instruction cracking, or otherwise obtained. The TID variable furthermore corresponds to the currently active thread's thread ID, e.g., an exemplary 2 bit vector, and the FRA_ADDR, FRB_ADDR, FRC_ADDR, and FRT_ADDR vectors are 7 bit vectors uniquely specifying one of 128 logical registers, corresponding to the architected state of 4 threads.

In step 570, exemplary 128 logical registers are renamed in accordance with a rename method, generating a unique physical register name in a register file having more than 128 entries, and control is passed to step 580. In accordance with this implementation, a register mapper is not cognizant of the threaded nature of the processor, and can dynamically assign any physical register to hold a logical register from any of the four threads.

In step 580, the processor-wide physical register number is used to perform at least one of a read and write access to a physical register file capable of storing registers for a plurality of threads, and the method is terminated.

Turning to FIG. 14A, a prior art instruction scheduling method commonly used in conjunction with the prior art register file of FIG. 4, is indicated generally by the reference numeral 1400. The method begins with test 1402.

In test 1402, the thread number tested. If the thread number corresponds to a first thread number, control passes to step 1404. Otherwise, control passes to step 1406.

In step 1404, a first instruction is issued corresponding to thread 0 to a first issue slot if a ready instruction is available for thread 0, and control is passed to step 1405.

In step 1405, a second instruction is issued corresponding to thread 0 to a second issue slot if a ready instruction is available for thread 1, and the method is terminated.

In step 1406, a first instruction is issued corresponding to thread 1 to a first issue slot if a ready instruction is available for thread 1, and control is passed to step 1407.

In step 1407, a second instruction is issued corresponding to thread 1 to a second issue slot if a ready instruction is available for thread 1, and the method is terminated.

Those skilled in the art will understand the limitations and disadvantages in requiring a first and second instruction to be from the same thread. Those skilled in the art will also understand the limitations of this approach due to a lack of register renaming capability.

Turning to FIG. 14B, a prior art instruction scheduling method commonly used for SMT processing in conjunction with the register file of FIG. 1A, and where instructions operands have been renamed in accordance with the method of FIG. 5B, is indicated generally by the reference numeral 1410.

The method starts with step 1412.

In step 1412, a first instruction is issued to a first issue slot if an instruction is ready for any thread, and control is passed to step 1413.

In step 1413 a second instruction is issued to a second issue slot if an instruction is ready for any thread, and the method is terminated.

While these methods allow the use of unmodified register file and register rename structures, they require support for arbitrary combinations of register file accesses from each port to any of the registers. While this affords flexibility and allows the use of thread-unaware register files and register mappers, it leads to wasteful designs with large area and delay.

SUMMARY

The present principles are directed to methods and apparatus for employing multi-bit register file cells and simultaneous multi-threading (SMT) thread groups.

According to an aspect of the present principles, there is provided an apparatus for a register file. The apparatus includes a plurality of multi-bit storage cells for storing a plurality of bits respectively corresponding to a plurality of threads. The apparatus further includes a plurality of port groups, operatively coupled to the plurality of multi-bit storage cells, responsive to physical register identifiers. The plurality of port groups is responsive to respective ones of a plurality of thread identifiers. Each of the plurality of thread identifiers are for uniquely identifying a particular thread from among a plurality of threads.

According to another aspect of the present principles, there is provided an apparatus for a register file. The apparatus includes a plurality of multi-bit storage cells for storing multiple bits corresponding to a plurality of threads. The apparatus further includes at least one port group, operatively coupled to the plurality of multi-bit storage cells, responsive to physical register identifiers and respective ones of a plurality of thread group identifiers. Each of the plurality of thread group identifiers is for uniquely identifying a thread group from among a plurality of thread groups.

According to yet another aspect of the present principles, there is provided an apparatus for a register file. The apparatus includes a plurality of multi-bit storage cells for storing multiple bits. The apparatus further includes at least two port groups, coupled to the plurality of multi-bit storage cells, responsive to physical register identifiers. Each of the at least two port groups have at least two ports. The at least two ports of at least one of the at least two port groups are responsive to a common selection signal indicating a selection of one bit from among multiple bits of at least one of the plurality of multi-bit storage cells.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1A shows a register file in accordance with the prior art;

FIG. 1B shows the use of a two-threaded storage array of conventional storage cells for storing multiple threads, in accordance with the prior art;

DETAILED DESCRIPTION OF PREFERRED EMBODIMENTS

Figure 2:
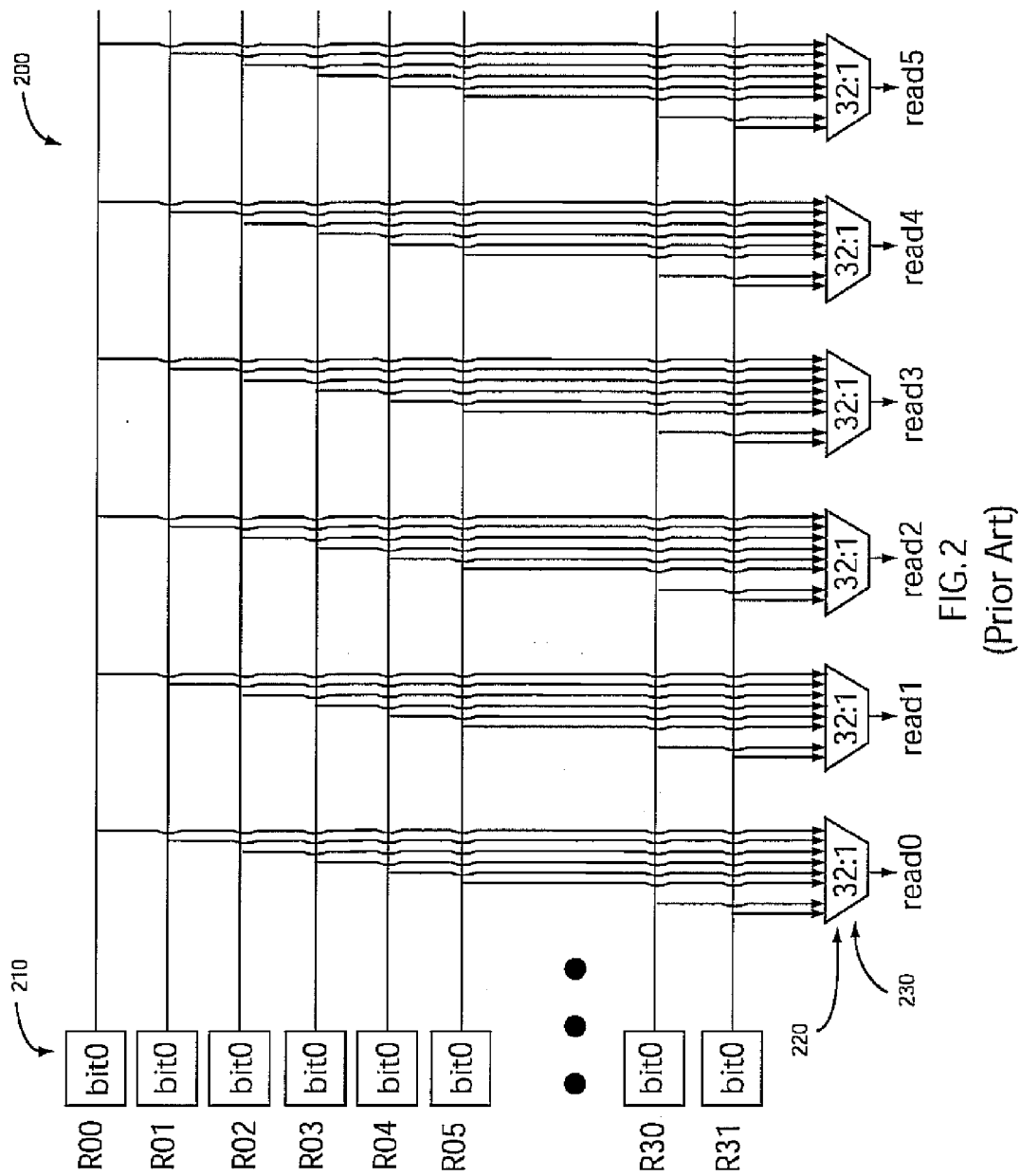
FIG. 2 shows an arrangement of six read ports for a register file, in accordance with the prior art.
Figure 3:
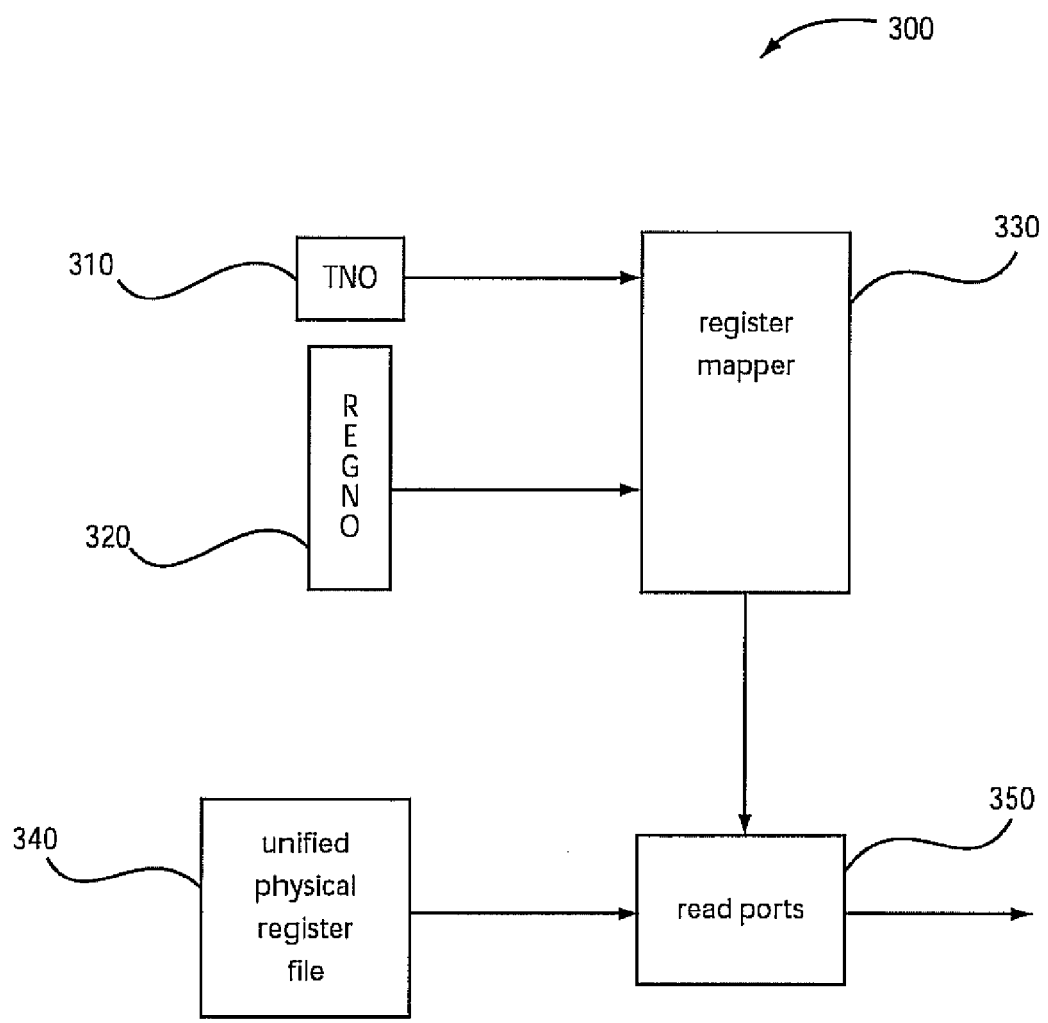
FIG. 3 shows a register rename architecture for multiple threads for use in conjunction with a hardware multi-threaded microprocessor, in accordance with the prior art.

The present principles are directed to methods and apparatus for employing multi-bit register file cells for simultaneous multi-threading (SMT) thread groups. Moreover, a method and apparatus for a register mapper in conjunction with multi-bit cells, and a register renamer in conjunction with instruction execution logic, are provided.

Advantageously, the present principles provide methods and apparatus for implementing register files, and register rename structures, as well as instruction execution methods operating in conjunction with these methods to facilitate the design of smaller, higher performance register files and rename structures, as compared to the prior art.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment (which includes, but is not limited to, firmware, resident software, microcode, and so forth) or an embodiment including both hardware and software elements. In a preferred embodiment, the present invention is implemented in hardware.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described herein is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GDSII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, the phrase "register source specifier" refers to a register number specifying the location of a source operand for an operation or instruction. The register source specifier is commonly derived by decoding an instruction word and extracting a register specifier field. In some microprocessor embodiments, register source specifiers can also be obtained by way of specification in microcode, instruction cracking tables, or by other means adapted to generate operations to be executed within the microprocessor.

Further, as used herein, the phrase "register target specifier" refers to a register number specifying the location where to write the result of an operation or instruction. The register target specifier is commonly derived by decoding an instruction word and extracting a register specifier field. In some microprocessor embodiments, register target specifiers can also be obtained by way of specification in microcode, instruction cracking tables, or by other means adapted to generate operations to be executed within the microprocessor.

Also, as used herein, the phrase "port group", which describes a previously undisclosed circuit design technique which is the subject of at least some embodiments of the present principles, refers to a group of ports sharing a common selection circuit such that all ports within the port group access registers from a common subset of bit values selected by the common selection circuit. This is to be contrasted with the prior art, which instead includes register ports wherein each port requires a full independent selection circuit.

Additionally, as used herein, the phrase "logical register specifiers" refers to a register number specified by an instruction, either explicitly in the instruction word as an instruction field, as an offset to an instruction pointer, implied in the definition of an instruction (such as implicit register operands), or the architected identifier of a register with respect to a single thread. The phrase "physical register specifiers" refers to a register number used to identify a specific hardware register, e.g., as might be obtained by register renaming, and commonly used to address a specific hardware location by providing the register number to a register file or other such hardware structure, to effect reading or writing of a register identified by said physical register specifier.

Moreover, as used herein, the phrase "multi-bit storage cell" represents a plurality of bit storage elements corresponding to similar bits attached to a common bit line. It is to be noted that the phrases "storage elements" and "storage cells" are used interchangeably herein.

Further, it is to be further noted that while the present principles are primarily described with respect to read ports for the sake of illustration and brevity, the present principles are also applicable to write ports, and embodiments may be directed to read ports, write ports, and both read ports and write ports, while maintaining the spirit of the present principles. Moreover, the preceding sentence is equally applicable to groups of ports.

Figure 6:
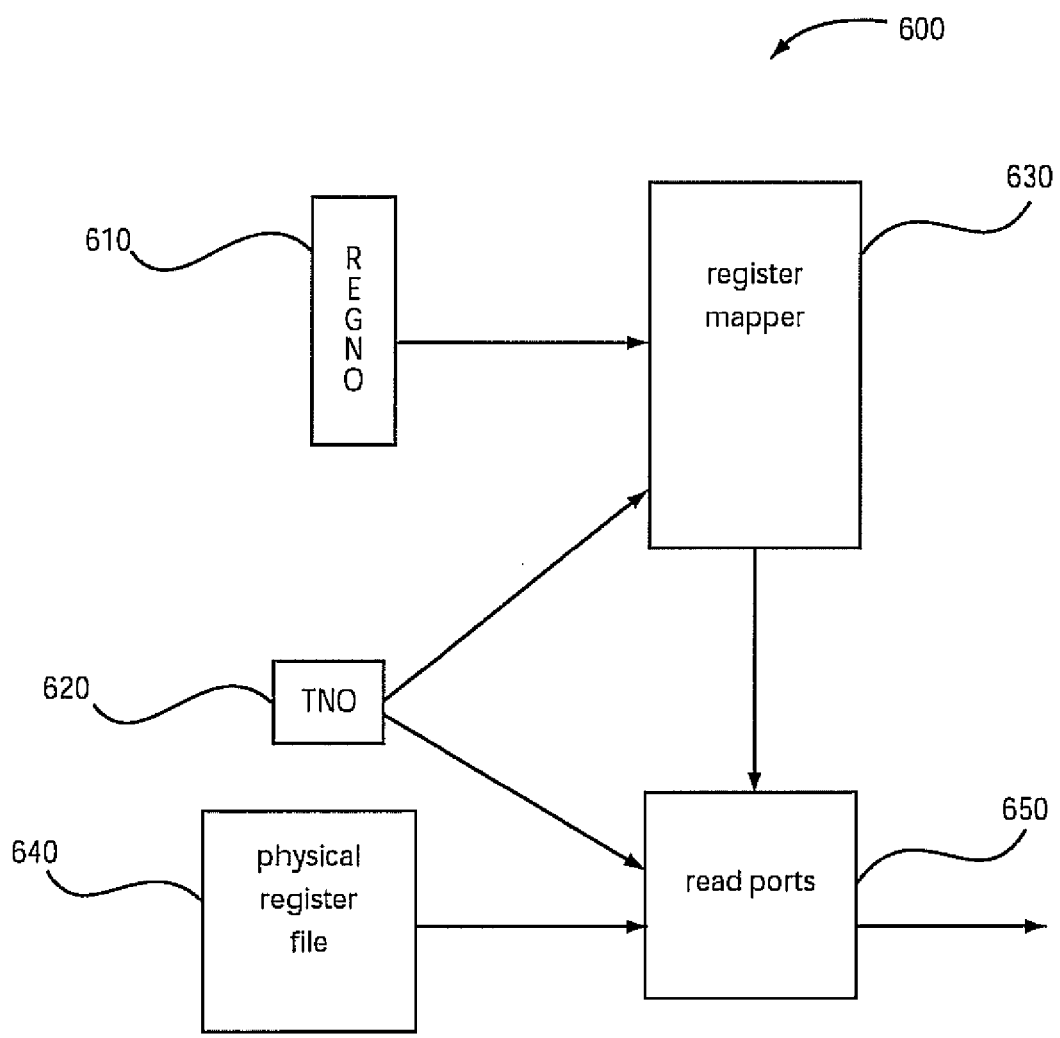
FIG. 6 shows an exemplary register mapper circuit configured to be responsive to a thread number, and generating physical register identifiers to be used in conjunction with register file ports responsive to the thread number, in accordance with an embodiment of the present principles.

Turning to FIG. 6, an exemplary register mapper circuit configured to be responsive to a thread number, and generating physical register identifiers to be used in conjunction with register file ports responsive to the thread number, in accordance with an embodiment of the present principles, is indicated generally by the reference numeral 600.

A logical register number 610 corresponding to a register being used for instruction execution is supplied to register mapper 630. A thread number 620 corresponding to the thread of the instruction is supplied to register mapper 630.

Figure 7A:
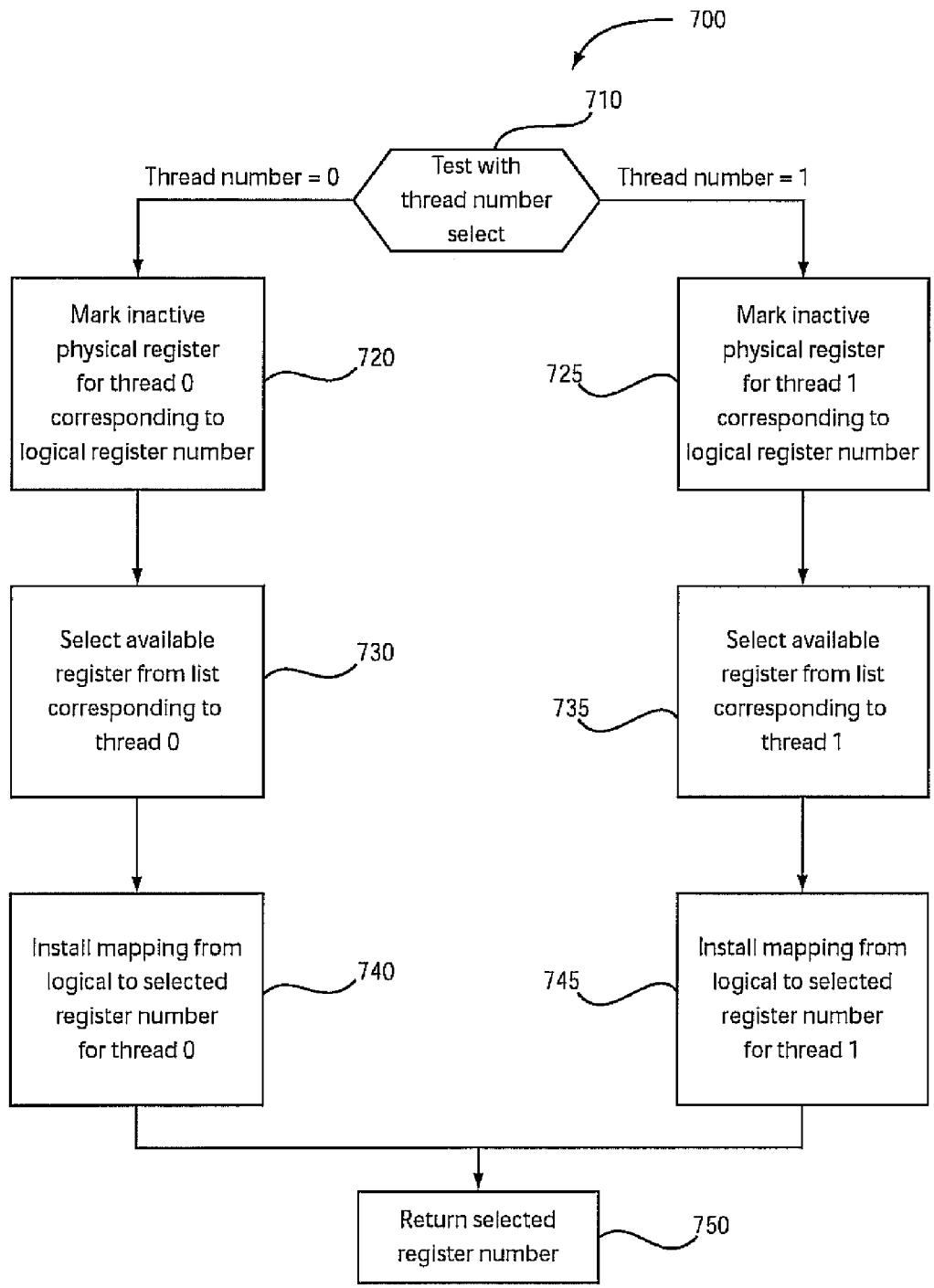
FIG. 7A shows an exemplary register rename method for renaming register target specifiers, in accordance with an embodiment of the present principles.
Figure 7B:
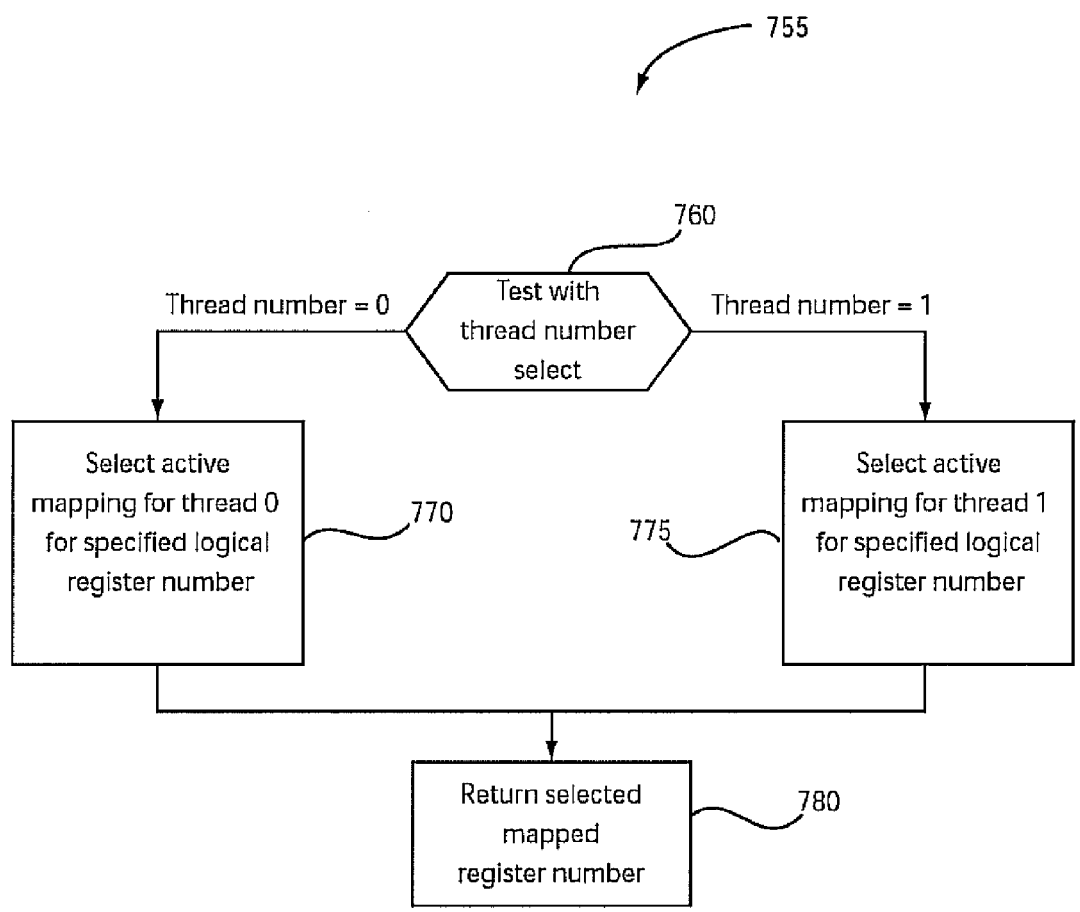
FIG. 7B shows an exemplary register rename method for renaming register source specifiers, in accordance with an embodiment of the present principles.

Register mapper renames the input logical register number 610 to a physical register number. Exemplary rename methods for register mapper 630 are shown in FIGS. 7A and 7B for a mapping a target and a source register, respectively.

Physical register file 640 is read-accessed by way of read ports 650, the read ports 650 being responsive to a first thread number 620, and a second physical register number generated by register mapper 630. In accordance with the present invention, in one embodiment, the register file 640 used in conjunction with the rename mapper 630 responsive to a thread number is a prior art multi-bit register file. In another embodiment, the register renaming structure with rename mapper 630 is used in conjunction with a multi-bit cell register file with read port groups wherein each read port group is individually responsive to a thread number 620 corresponding to the thread of an instruction using the read port group to retrieve operands.

In one embodiment, the rename mapper 630 is implemented using a rename apparatus in accordance with U.S. patent application Ser. No. 11/619,248 to Gschwind, entitled "REGISTER MAP UNIT SUPPORTING MAPPING OF MULTIPLE REGISTER SPECIFIER CLASSES", filed on as Jan. 3, 2007, commonly assigned to the assignee herein, and incorporated by reference herein. In accordance with this embodiment, a specific class of the apparatus will be used to map a specific thread's registers. Those skilled in the art will understand that other prior art mappers can be modified to work in conjunction with the present principles, or may be implemented based on the teachings of the rename methods of FIGS. 7A and 7B, while maintaining the spirit of the present principles.

While the exemplary embodiment shown herein shows a read access, those skilled in the art will understand that a similar structure will be used to rename register target specifiers in conjunction with the present principles.

Figure 4:
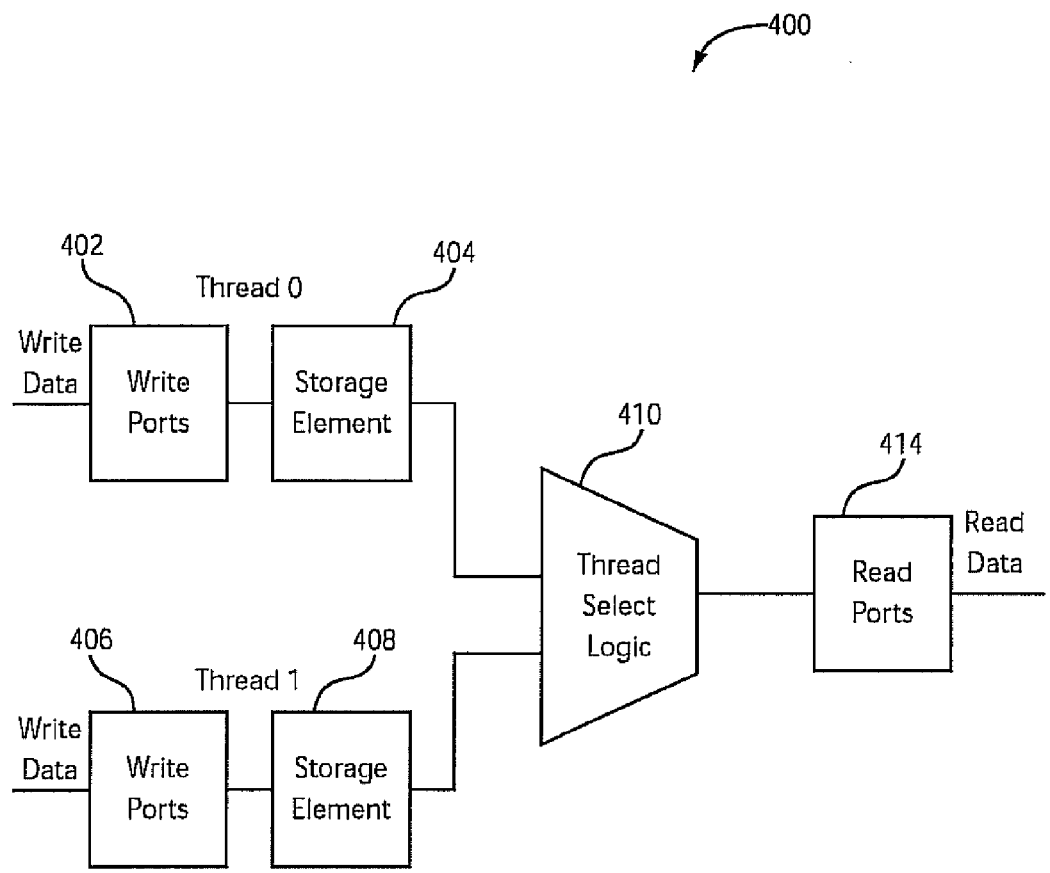
FIG. 4 shows a two-threaded storage cell with a multi-threaded read port, in accordance with the prior art.
Figures 5A, 5B:
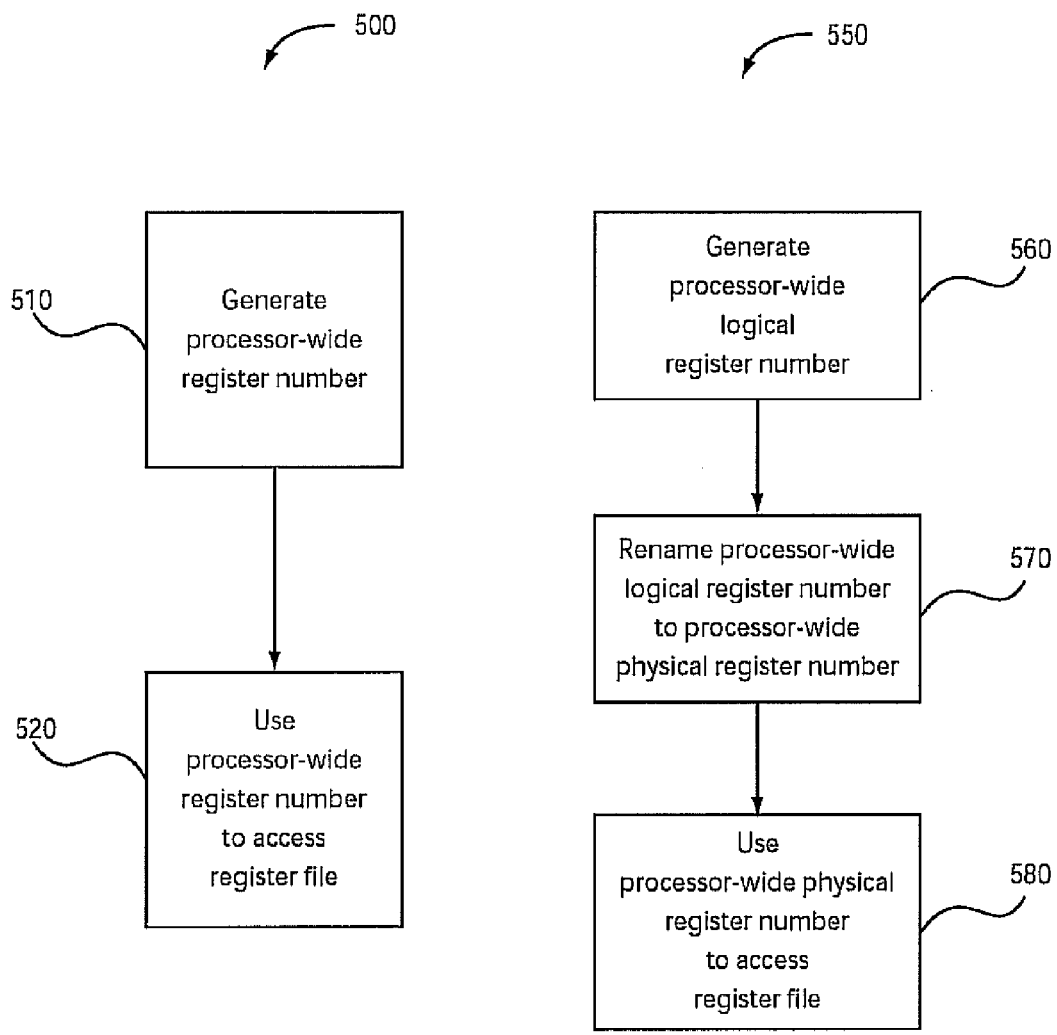
FIG. 5A shows a method for generating register file addresses in a processor with hardware-multi-threading that does not implement register renaming and in conjunction with a conventional register file, in accordance with the prior art.
FIG. 5B shows a method for generating register file addresses in a processor with hardware-multi-threading that implements register renaming and in conjunction with a conventional register file, in accordance with the prior art.

Turning to FIG. 7A, an exemplary register rename method for renaming register target specifiers, in accordance with an embodiment of the present principles, is indicated generally by the reference numeral 700. The method 700 may be used, for example, but is not limited to such use, with respect to any of the register mapper 630 of FIG. 6, the register file 800 of FIG. 8, and the register file corresponding to FIG. 4.

The method begins with test 710. Test 710 determines whether a register corresponding to a first thread or a second thread is being renamed. If the register corresponds to a register of a first thread, control passes to step 720. Otherwise, control passes to step 725.

In step 720, a physical register corresponding to the current mapping of a logical register number of a first thread 0 is marked inactive, and control is passed to step 730.

In step 730, an available register is selected from a list of available physical rename registers corresponding to registers for thread 0 (and commonly accessible using the read port when the thread is selected in accordance with FIG. 6), and control is passed to step 740.

In step 740, a mapping is installed mapping the logical register number to the selected physical register number selected in step 730 for a first thread 0, and control is passed to step 750.

In step 725, a physical register corresponding the current mapping of a logical register number of a second thread 1 is marked inactive, and control is passed to step 735.

In step 735, an available register is selected from a list of available physical rename registers corresponding to registers for thread 1 (and commonly accessible using the read port when the thread is selected in accordance with FIG. 6), and control is passed to step 745.

In step 745, a mapping is installed mapping the logical register number to the selected physical register number selected in step 735 for a second thread 1, and control is passed to step 750.

In step 750, the selected register number is returned, and the method is terminated.

Those skilled in the art will understand that test 710 can test for more than 2 threads, and will understand to apply the method to rename registers for additional threads in accordance with the teachings provided herein.

Those skilled in the art will understand that in an embodiment of the present principles, the register rename logic returns a physical register number referring to one of a plurality of physical registers, and that multiple threads will use the same range of physical rename registers. In conjunction with the responsiveness of write ports (corresponding to the exemplary read ports 650 of FIG. 6 in a write port paths) to the thread number 620 will the shared common physical rename range be resolved to refer to a specific identifier of a multi-bit cell register file, providing the advantages of both register renaming and multi-bit cell register files to microprocessors practicing the current principles.

Turning to FIG. 7B, an exemplary register rename method for renaming register source specifiers, in accordance with an embodiment of the present principles, is indicated generally by the reference numeral 755. The method 755 may be used, for example, but is not limited to such use, with respect to any of the register mapper 630 of FIG. 6, the register file 800 of FIG. 8, and the register file corresponding to FIG. 4.

The method begins with test 760. Test 760 determines whether a register corresponding to a first thread or a second thread is being renamed. If the register corresponds to a register of a first thread, control passes to step 770. Otherwise, control passes to step 775.

In step 770, the currently active mapping for a first thread 0 for a specified logical register number to a physical register number is selected, and control is passed to step 780.

In step 775, the currently active mapping for a second thread 1 for a specified logical register number to a physical register number is selected, and control is passed to step 780.

In step 780, the selected physical register number is returned, and the method is terminated.

Those skilled in the art will understand that test 610 can test for more than 2 threads, and will understand to apply the method to rename registers for additional threads in accordance with the teachings of the present principles, while maintaining the spirit of the present principles.

Those skilled in the art will understand that in an embodiment of the present principles, the register rename logic returns a physical register number referring to one of a plurality of physical registers, and that multiple threads will use the same range of physical rename registers. In conjunction with the responsiveness of the read ports 650 to the thread number 620 will the shared common physical rename range be resolved to refer to a specific identifier of a multi-bit cell register file, providing the advantages of both register renaming and multi-bit cell register files to microprocessors practicing the present principles.

Figure 8:
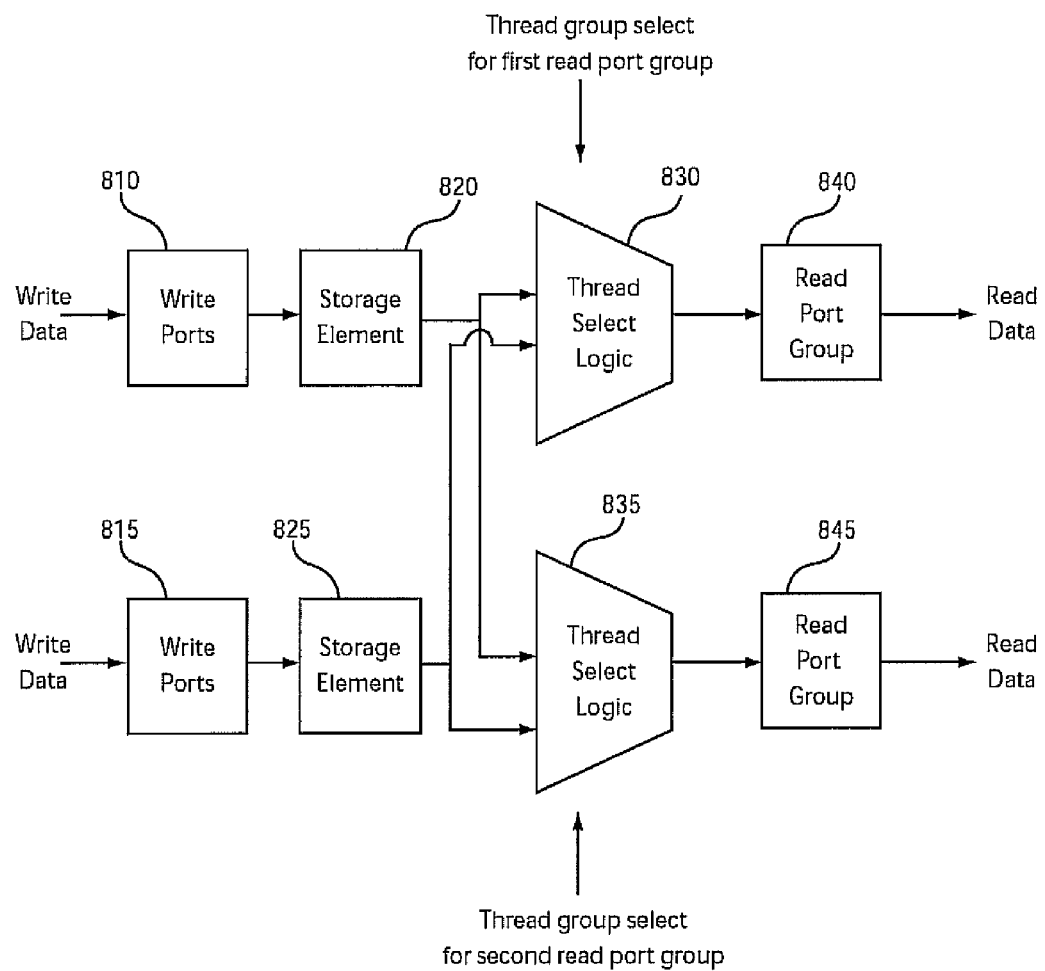
FIG. 8 shows an exemplary multi-bit-cell register file with a plurality of read port groups, in accordance with an embodiment of the present principles.

Turning to FIG. 8, an exemplary multi-bit-cell register file with a plurality of read port groups, in accordance with an embodiment of the present principles, is indicated generally by the reference numeral 800. A multi-bit-cell register file with read port groups in accordance with the present principles allows data from a first set of bit cells in a register file having multiple bits per register file cell, corresponding to the storage of a first thread, to be accessed by a first set of read ports of a read port group in order to access operands of a first instruction corresponding to a first thread. Moreover, a multi-bit-cell register file with read port groups in accordance with the present principles allows data from a second set of bit cells in a register file having multiple bits per register file cell, corresponding to the storage of a second thread, to be accessed by a second set of read ports of a read port group in order to access operands of a second instruction corresponding to a second thread.

Advantageously, a register file with multiple bit cells per register cell in accordance with the present principles includes at least a first storage element 820 for storing data from a first thread or a first thread group, and a second storage element 825 for storing data from a second thread or a second thread group.

Storage element 820 is operatively coupled to one or more write ports 810. Storage element 825 is operatively coupled to one or more write ports 815.

Storage elements 820 and 825 are both operatively coupled to thread selection logic 830 and 835. Thread selection logic 830 is responsive to a thread select signal corresponding to a first read port group. Thread selection logic 835 is responsive to a thread select signal corresponding to a second read port group.

In another embodiment, thread selection logic 830 is responsive to a thread group select signal corresponding to a first read port group, and thread selection logic 835 is responsive to a thread group select signal corresponding to a second read port group.

Thread selection logic 830 is operatively coupled to read port group 840. Thread selection logic 835 is operatively coupled to read port group 845.

In accordance with an embodiment of the present principles, a read port group is a group of read ports using as input a common thread selection circuit, and using reduced wiring resources driven by the output of the thread selection signals. An exemplary implementation of a read port group scheme will be shown with respect to FIG. 9.

While the exemplary embodiment of FIG. 8 shows a read port group in accordance with an embodiment of the present principles, other embodiments within the scope of the present principles may employ other write port groups operatively coupled to thread selection logic. In yet another embodiment in accordance with the present principles, a register file may employ both read port and write port groups.

Figure 9:
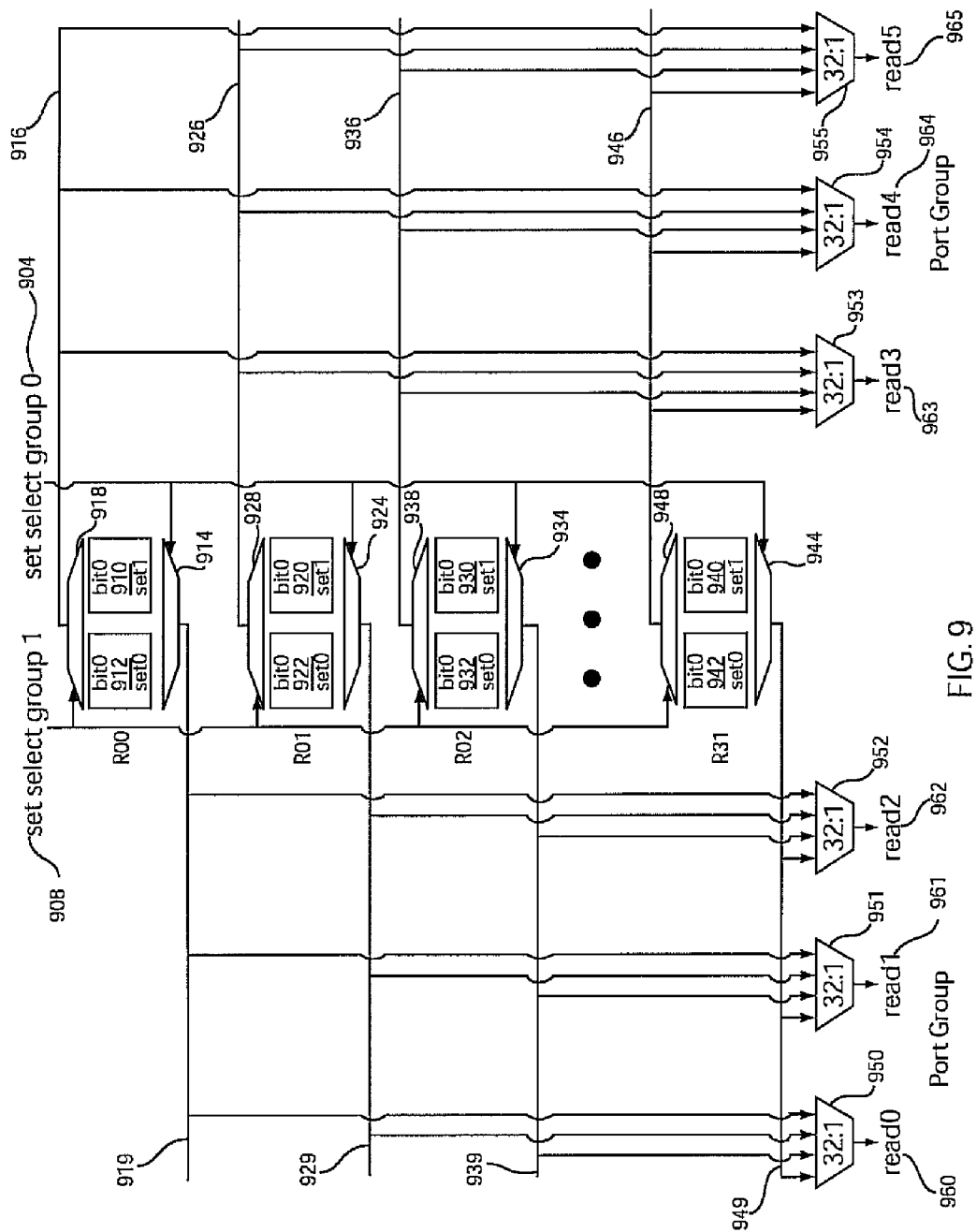
FIG. 9 shows an exemplary implementation of a register file with two bit storage cells and two read port groups, in accordance with an embodiment of the present principles.

Turning to FIG. 9, an exemplary implementation of a register file with two bits storage cells and two read port groups, in accordance with an embodiment of the present principles, is indicated generally by the reference numeral 900.

Register file 900 includes 32 registers R00 to R31, each with 2 bit cells. Preferably, the bit cells correspond to a first thread or first thread group, and a second thread or second thread group, respectively. Specifically, there is shown a bit position 0 for a first set of bit cells (that include bit cells 910, 920, 930, and 940) corresponding to a first thread (thread group) for registers R00 to R31, and bit position 0 for a second set of bit cells (that include bit cells 912, 922, 932, and 942) corresponding to a second thread (thread group) for registers R00 to R31. Bit cells 910, 920, 930, 940 correspond to implementations of storage element 820 of FIG. 8. Bit cells 912, 922, 932, 942 correspond to implementations of storage element 825 of FIG. 8.

Bit cells 910 and 912 are operatively coupled to selection logic 914 and responsive to a set select signal 904 for read port group 0, generating select output 919. Selection logic 914 corresponds to an implementation of thread select logic 830 of FIG. 8.

Bit cells 920 and 922 are operatively coupled to selection logic 924 and responsive to a set select signal 904 for read port group 0, generating select output 929. Selection logic 924 corresponds to an implementation of thread select logic 830 of FIG. 8.

Bit cells 930 and 932 are operatively coupled to selection logic 934 and responsive to a set select signal 904 for read port group 0, generating select output 939. Selection logic 934 corresponds to an implementation of thread select logic 830 of FIG. 8.

Bit cells 940 and 942 are operatively coupled to selection logic 944 and responsive to a set select signal 904 for read port group 0, generating select output 949. Selection logic 944 corresponds to an implementation of thread select logic 830 of FIG. 8.

In accordance with the present invention, a first read port group includes read ports 960, 961, and 962 operatively coupled to read port selectors 950, 951, and 952 all operatively coupled to select outputs 919, 929, 939, and 949.

Bit cells 910 and 912 are operatively coupled to selection logic 918 and responsive to a set select signal 908 for read port group 1, generating select output 916. Selection logic 918 corresponds to an implementation of thread select 835 of FIG. 8.

Bit cells 920 and 922 are operatively coupled to selection logic 928 and responsive to a set select signal 908 for read port group 1, generating select output 926. Selection logic 928 corresponds to an implementation of thread select 835 of FIG. 8.

Bit cells 930 and 932 are operatively coupled to selection logic 938 and responsive to a set select signal 908 for read port group 1, generating select output 936. Selection logic 938 corresponds to an implementation of thread select 835 of FIG. 8.

Bit cells 940 and 942 are operatively coupled to selection logic 948 and responsive to a set select signal 904 for read port group 1, generating select output 946. Selection logic 948 corresponds to an implementation of thread select 835 of FIG. 8.

In accordance with the present invention, a second read port group includes read ports 963, 964, and 965 operatively coupled to read port selectors 953, 954, and 955 all operatively coupled to select outputs 916, 926, 936, and 946.

Those skilled in the art will understand that the exemplary logic of embodiment of a register file in accordance with FIG. 8 will include additional cells, selection circuits, and inputs to read selectors corresponding to registers R03 to R30. Additionally, wider register files can be implemented by replicating the described structure for multiple bits. Implementations using register files having a number of registers greater or smaller than 32 may be readily implemented given the teachings of the present principles provided herein, while maintaining the spirit of the present principles.

Figure 10:
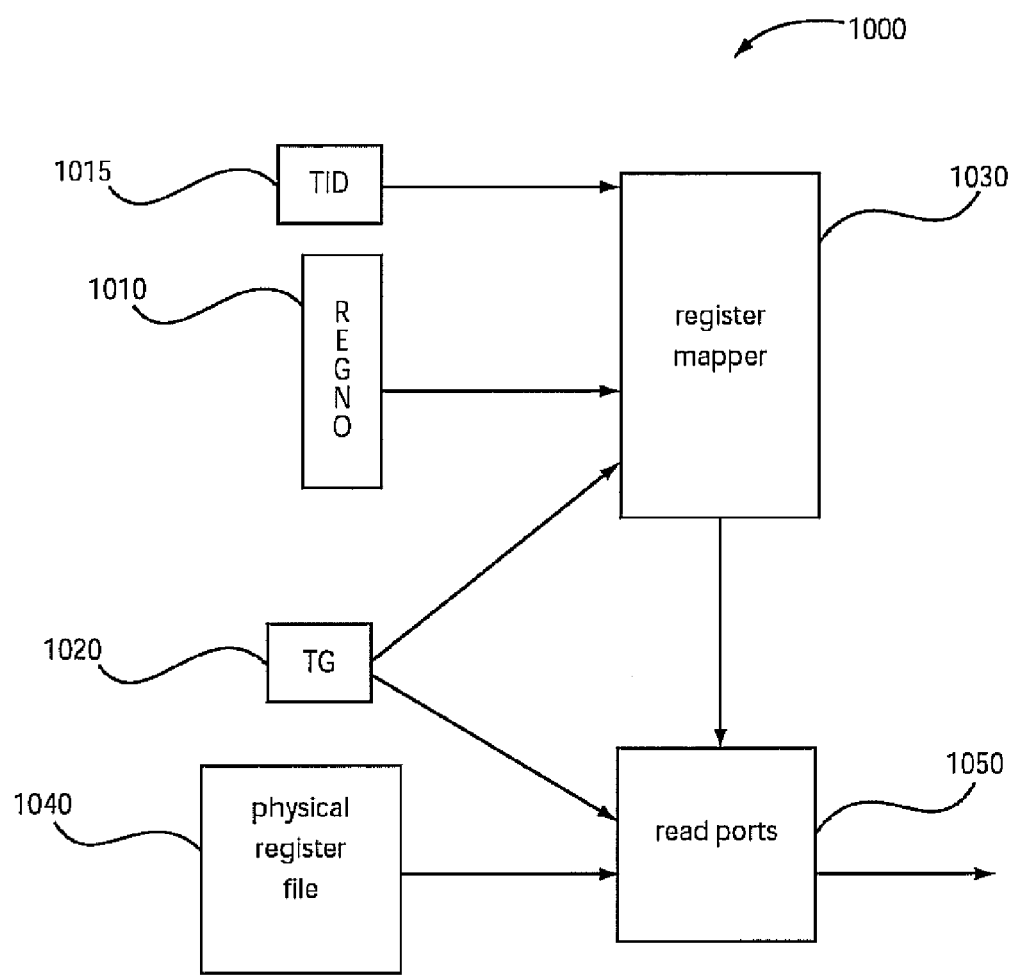
FIG. 10 shows an exemplary register mapper configured to be responsive to a thread group number and a thread identifier, in accordance with an embodiment of the present principles.

Turning to FIG. 10, an exemplary register mapper configured to be responsive to a thread group number and a thread identifier, in accordance with an embodiment of the present principles, is indicated generally by the reference numeral 1000. Advantageously, this structure overcomes the limitation of requiring a bit cell for each rename register for each thread within a register file cell while applying the advantages of multi-bit cell register files and associated register rename structures to microprocessors having multiple threads, and specifically more threads than bit cells within a multi-bit cell register file.

In another embodiment relating to FIG. 10, the present principles allow physical registers to be shared dynamically within a thread group.

In accordance with an embodiment of the present principles, a thread group is a group of threads using a common set of bits within a multi-bit per cell register file. In accordance with this definition, a thread number is used to identify a thread group for the thread, and a thread identifier is generated from the thread number to identify a specific thread within a thread group.

Those skilled in the art will understand that assignment of threads to thread groups can be performed by design, or using a configurable mapping, which may modified in response to either firmware specifications, or more dynamically, in response to workload behavior, by control software, such as including, but not limited to, firmware, hypervisor, or operating systems.

In one static binding a thread group is identified by selecting at least one bit of a thread number, and a thread identifier is generated using the remaining threads, such as described by the following exemplary VHDL fragment to select one of two thread groups for up to 8 threads, and generate a thread identifier:

TG<=TNO(0)
TID<=TNO(1 to 2)

Those skilled in the art will identify other ways of generating thread group and thread identifiers based on a thread number within the scope of the present invention, such as including, but not limited to, table lookups, hash function, and so forth.

Referring again to FIG. 10, a logical register number 1010 corresponding to a register being used for instruction execution is supplied to register mapper 1030 in conjunction with a thread identifier 1015 uniquely identifying the thread of the instruction with respect to other threads in a thread group, but not with respect to all threads in a system. A thread group number 1020 corresponding to the thread group of the instruction is supplied to register mapper 1030.

Figure 11:
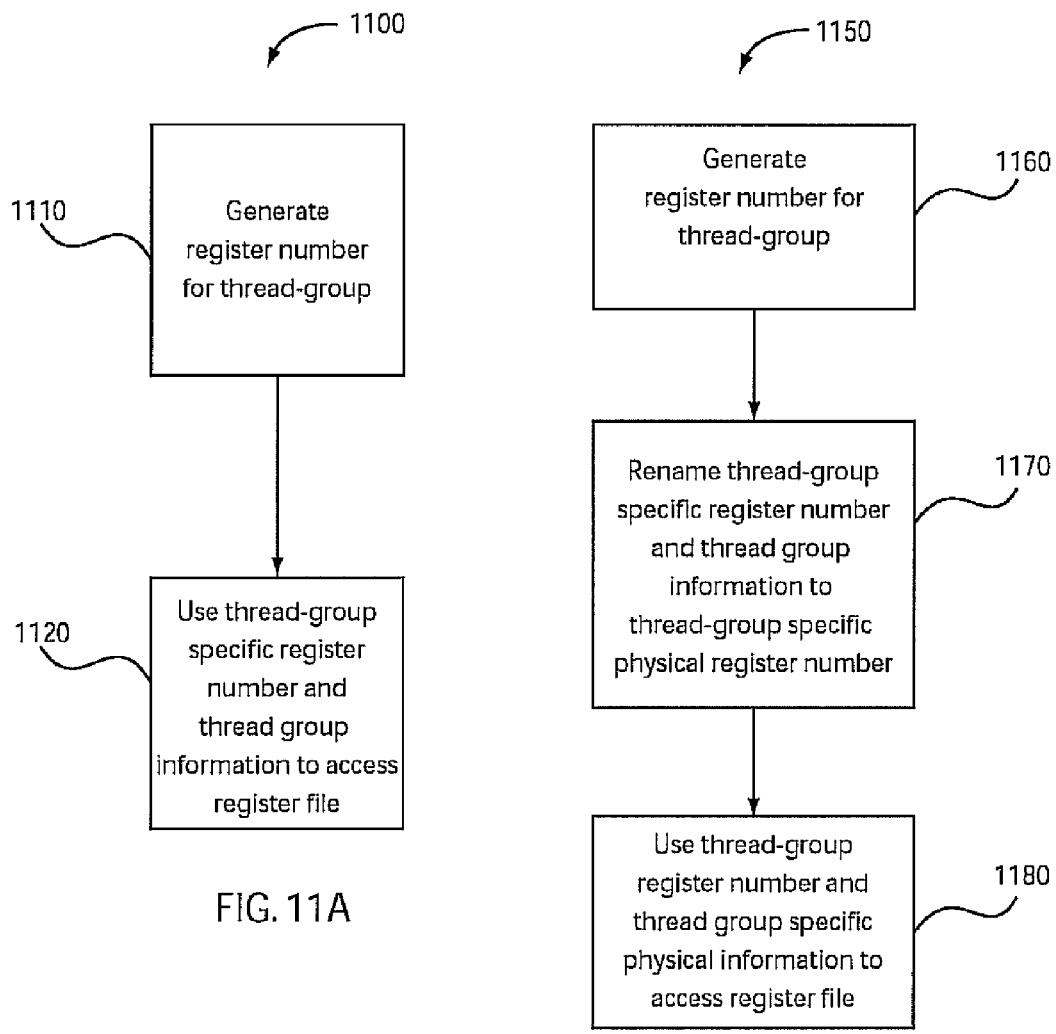
FIG. 11A shows an exemplary method for uniquely identifying registers within a thread group and accessing the register within a thread group in a microprocessor that does not implement register renaming, in accordance with an embodiment of the present principles.
FIG. 11B shows an exemplary method for uniquely identifying registers within a thread group and accessing the register within a thread group in a microprocessor that implements register renaming, in accordance with an embodiment of the present principles.

Register mapper 1030 renames the input logical register number 1010 to a physical register number using at least thread identifier (TID) 1015, Exemplary rename methods for register mapper 1030 are shown in FIGS. 11A and 11B for a mapping a target and a source register, respectively.

Physical register file 1040 is read-accessed by way of read ports 1050, the read ports being responsive to a first thread group number 1020, and a second physical register number generated by register mapper 1030. In one embodiment, the register file 1040 used in conjunction with the rename mapper 1030 responsive to a thread number is a prior art multi-bit register file. In another embodiment, the register renaming structure with rename mapper 1030 is used in conjunction with a multi-bit cell register file with read port groups wherein each read port group is individually responsive to a thread group number 1020 corresponding to the thread group of an instruction using the read port group to retrieve operands.

In one embodiment, the rename mapper 1030 is implemented using a rename apparatus in accordance with that described by U.S. patent application Ser. No. 11/619,248 to Gschwind, entitled "REGISTER MAP UNIT SUPPORTING MAPPING OF MULTIPLE REGISTER SPECIFIER CLASSES", filed on as Jan. 3, 2007, commonly assigned to the assignee herein, and incorporated by reference herein. In accordance with this embodiment, a specific class of the apparatus will be used to map a specific thread group's registers. Those skilled in the art will understand that other prior art mappers can be modified to work in conjunction with the present principles, or may be implemented based on the teachings of the rename methods of FIGS. 13A and 13B.

While the exemplary embodiment shown herein shows a read access, those skilled in the art will understand that a similar structure will be used to rename register target specifiers in conjunction with the present principles.

Turning to FIG. 11A, an exemplary method for uniquely identifying registers within a thread group and accessing the register within a thread group in a microprocessor that does not implement register renaming, in accordance with an embodiment of the present principles, is indicated generally by the reference numeral 1100. The method 1100 may be used, for example, but is not limited to such use, with respect to any of the register file 800 of FIG. 8 and the register file corresponding to FIG. 4.

In step 1110, a physical register number uniquely identifying a physical register with respect to a thread group is generated, and control is passed to step 1120. In one embodiment, this is accomplished by concatenating a logical register number with a thread identifier, the thread identifier being suitable for uniquely identifying a thread with respect to other threads within a thread group, but not necessarily all threads.

In step 1120, the thread-group specific physical register number of step 1110 is used to access a physical register, under control of selection logic responsive to a thread group number uniquely identifying the thread group of the generated physical address of step 1110, and the method is terminated.

Turning to FIG. 11B, an exemplary method for uniquely identifying registers within a thread group and accessing the register within a thread group in a microprocessor that implements register renaming, in accordance with an embodiment of the present principles, is indicated generally by the reference numeral 1150. The method 1150 may be used, for example, but is not limited to such use, with respect to any of the register file 800 of FIG. 8 and the register file corresponding to FIG. 4.

In step 1160, a logical register number uniquely identifying a logical register with respect to a thread group is generated, and control is passed to step 1170. In one embodiment, this is accomplished by concatenating a logical register number with a thread identifier, the thread identifier being suitable for uniquely identifying a thread with respect to other threads within a thread group, but not necessarily all threads.

In step 1170, a thread group specific logic register number is renamed to a thread-group specific physical register number, and control is passed to step 1180. In an embodiment, this is preferably accomplished using the rename methods of FIGS. 13A and 13B.

In step 1180, the thread-group specific physical register number of step 1170 is used to access a physical register, under control of selection logic responsive to a thread group number uniquely identifying the thread group of the generated physical address of step 1110, and the method is terminated.

Figure 12:
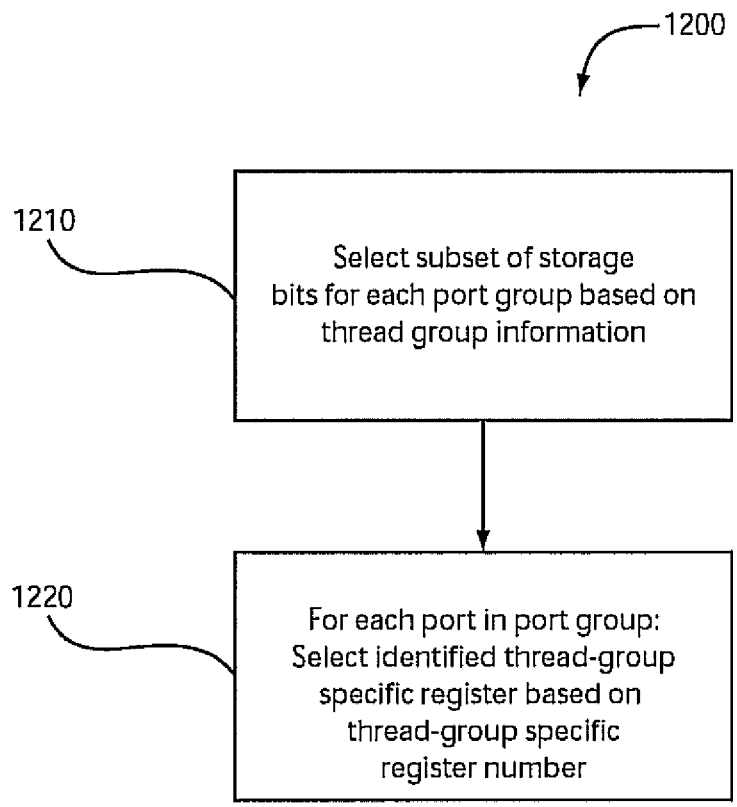
FIG. 12 an exemplary method for the operation of a register file having multiple read port groups in conjunction with thread groups, in accordance with an embodiment of the present principles.

Turning to FIG. 12, an exemplary method for the operation of a register file having multiple read port groups in conjunction with thread groups, in accordance with an embodiment of the present principles, is indicated generally by the reference numeral 1200. The method 1200 may be used, for example, but is not limited to such use, with respect to the register file 800 of FIG. 8.

The method 1200 starts with step 1210.

In step 1210, selection logic selects a subset of storage bits from the multiple bits within each multi-bit cell for each port group, in response to a thread group number being selected for the port group, and control is passed to step 1220.

In step 1220, for each port in a port group, a selection is performed responsive to a physical register number from the bits selected in step 1210 and corresponding to that physical register number for the thread group, and the method is terminated.

Figure 13A:
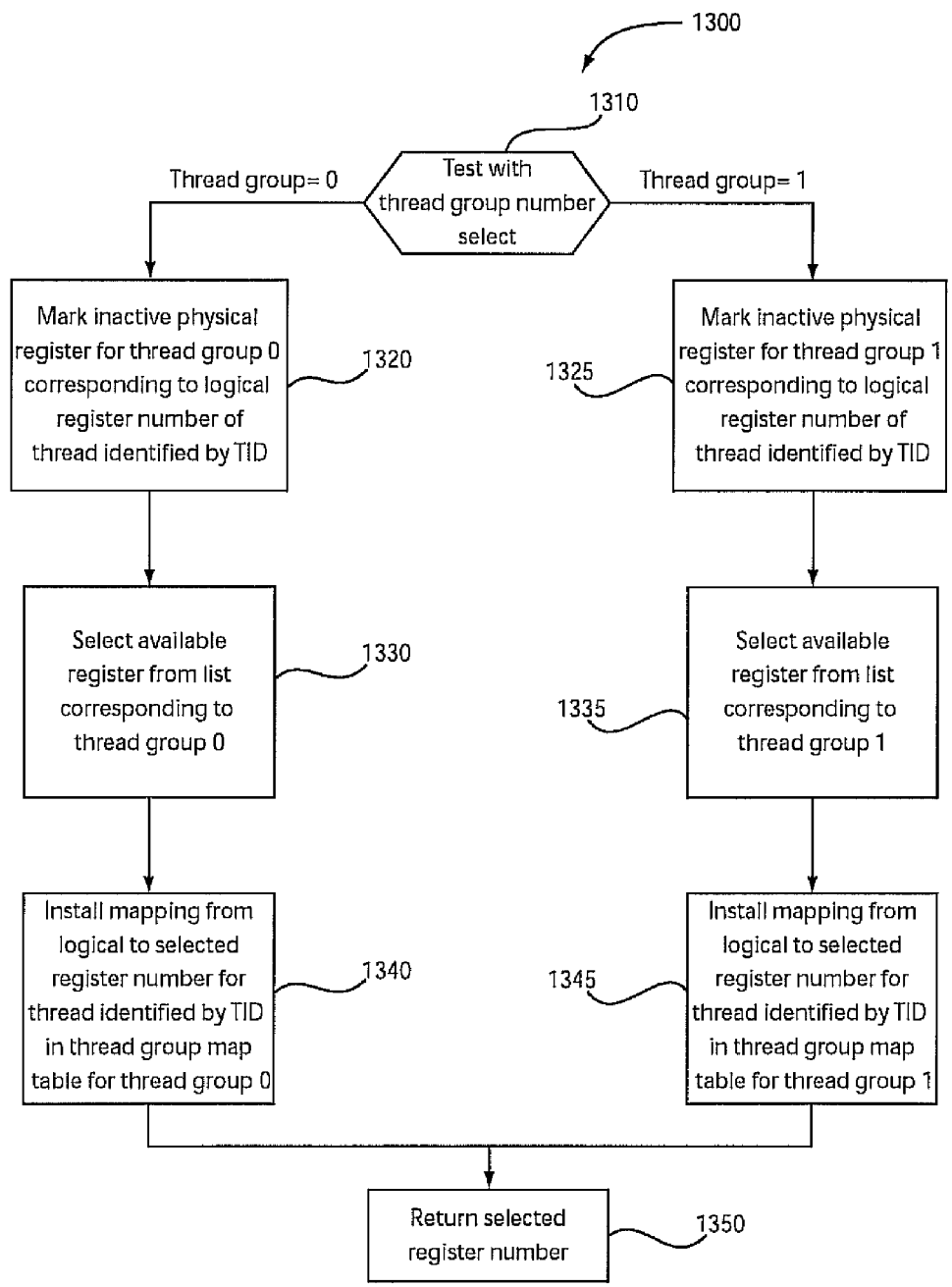
FIG. 13A shows an exemplary register rename method for renaming register target specifiers in a register mapper operating in conjunction with thread groups, in accordance with an embodiment of the present principles.

Turning to FIG. 13A, an exemplary register rename method for renaming register target specifiers in a register mapper operating in conjunction with thread groups, in accordance with an embodiment of the present principles, is indicated generally by the reference numeral 1300. The method 1300 may be used, for example, but is not limited to such use, with respect to any of the register file 800 of FIG. 8 and the register file corresponding to FIG. 4.

The method begins with test 1310. Test 1310 determines whether a register corresponding to a first thread group or a second thread group is being renamed. If the register corresponds to a register of a first thread group, control passes to step 1320. Otherwise, control passes to step 1325.

In step 1320, a physical register corresponding to the current mapping of a logical register number of a thread identified by its thread identifier (TID) with respect to other threads within thread group 0 (but not with respect to all threads) is marked inactive, and control is passed to step 1330.

In step 1330, there is selected an available register from a list of available physical rename registers corresponding to registers for thread group 0 (and commonly accessible using the read port when the thread group is selected in accordance with FIG. 10), and control is passed to step 1340.

In step 1340, a mapping is installed mapping the logical register number for the thread identified by the thread identifier (TID) with respect to other threads in thread group 0 (but not with respect to all threads) to the selected physical register number selected in step 1330 for a first thread group 0, and control is passed to step 1350.

In step 1325, a physical register corresponding to the current mapping of a logical register number of a thread identified by its thread identifier (TID) with respect to other threads within thread group 1 (but not with respect to all threads) is marked inactive, and control is passed to step 1335.

In step 1335, there is selected an available register from a list of available physical rename registers corresponding to registers for thread group 1 (and commonly accessible using the read port when the thread group is selected in accordance with FIG. 10), and control is passed to step 1345.

In step 1345, a mapping is installed mapping the logical register number for the thread identified by the thread identifier (TID) with respect to other threads in thread group 1 (but not with respect to all threads) to the selected physical register number selected in step 1335 for a second thread group 1, and control is passed to step 1350.

In step 1350, the selected register number is returned, and the method is terminated.

Those skilled in the art will understand that test 1310 can test for more than 2 thread groups, and will understand to apply the method to rename registers for additional threads in accordance with the teachings of the present principles, while maintaining the spirit of the present principles.

Also, those skilled in the art will understand that in an embodiment of the present principles, the register rename logic returns a physical register number referring to one of a plurality of physical registers, and that multiple threads will use the same range of physical rename registers. In conjunction with the responsiveness of write ports (corresponding to the exemplary read ports 1050 of FIG. 10 in a write port path) to the thread group number 1020 will the shared common physical rename range be resolved to refer to a specific bit of a multi-bit cell register file, providing the advantages of both register renaming and multi-bit cell register files to microprocessors practicing the present principles.

Figure 13B:
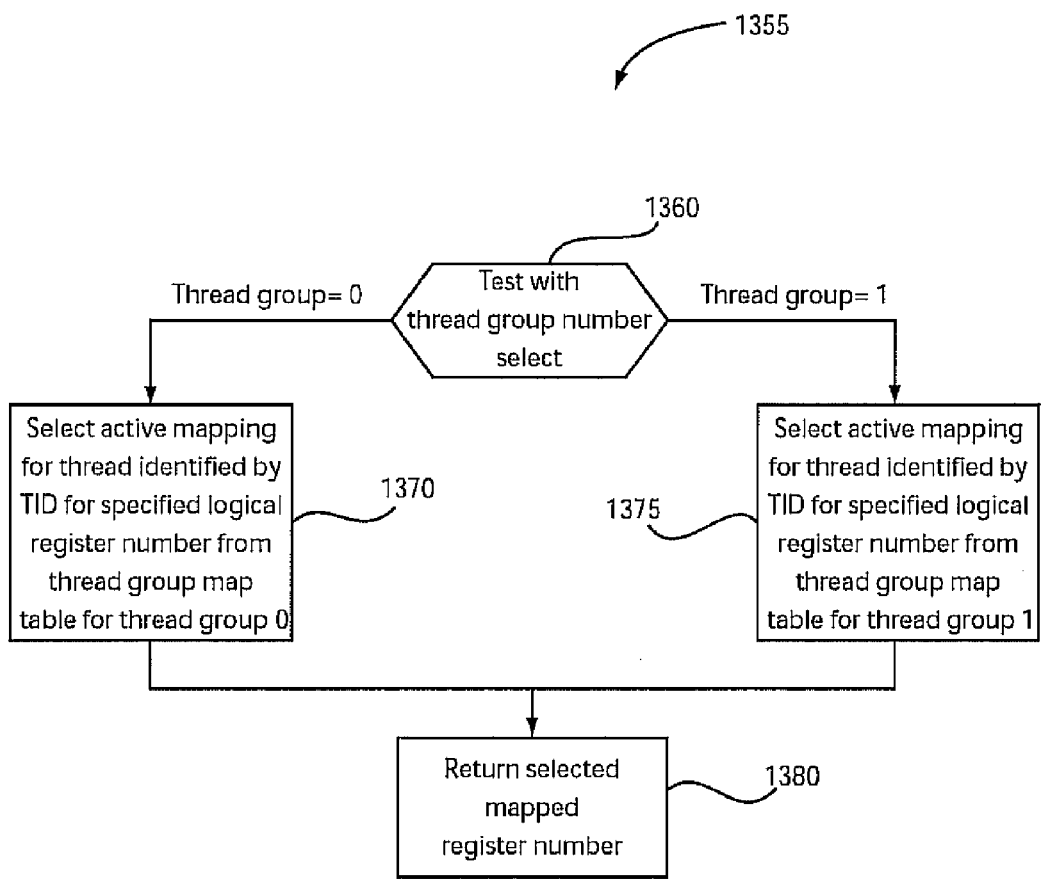
FIG. 13B shows an exemplary register rename method for renaming register source specifiers in conjunction with thread groups, in accordance with an embodiment of the present principles.

Turning to FIG. 13B, an exemplary register rename method for renaming register source specifiers in conjunction with thread groups, in accordance with an embodiment of the present principles, is indicated generally by the reference numeral 1355. The method 1355 may be used, for example, but is not limited to such use, with respect to any of the register file 800 of FIG. 8 and the register file corresponding to FIG. 4.

The method begins with test 1360. Test 1360 determines whether a register corresponding to a first thread group or a second thread group is being renamed. If the register corresponds to a register of a first thread group, control passes to step 1370. Otherwise, control passes to step 1375.

In step 1370, the currently active mapping for a thread identified by thread identifier (TID) with respect to other threads in a first thread group 0 (but not with respect to all threads) for a specified logical register number to a physical register number is selected, and control is passed to step 1380.

In step 1375, the currently active mapping for a thread identified by thread identifier (TID) with respect to other threads in a second thread group 1 (but not with respect to all threads) for a specified logical register number to a physical register number is selected, and control is passed to step 1380.

In step 1380, the selected physical register number is returned, and the method is terminated.

Those skilled in the art will understand that test 1310 can test for more than 2 threads, and will understand to apply the method to rename registers for additional threads in accordance with the teachings of the present principles provided herein, while maintaining the spirit of the present principles.

Also, those skilled in the art will understand that in an embodiment of the present principles, the register rename logic returns a physical register number referring to one of a plurality of physical registers, and that multiple threads will use the same range of physical rename registers. In conjunction with the responsiveness of the read ports 650 to the thread number 620 will the shared common physical rename range be resolved to refer to a specific it of a multi-bit cell register file, providing the advantages of both register renaming and multi-bit cell register files to microprocessors practicing the current invention.

Having thus outlined the many advantageous aspects of using novel multi-bit cell structures having port groups responsive to one of thread selects and thread group selectors, and furthermore optionally operating on renamed register specifiers cognizant of multi-bit cell structures, we proceed to teach instruction issue policies enabled by the present invention for the flexible use of multi-bit cell register files in conjunction with hardware-based multi-threading.

While the present method delivers the best scheduling result because of its flexibility, it requires the use of a register file not offering the density and area efficiency advantages of a register file storing multiple data bits in a single register file cell, thereby increasing the area of the register file, and logic delay for accessing the register file.

Figure 14A:
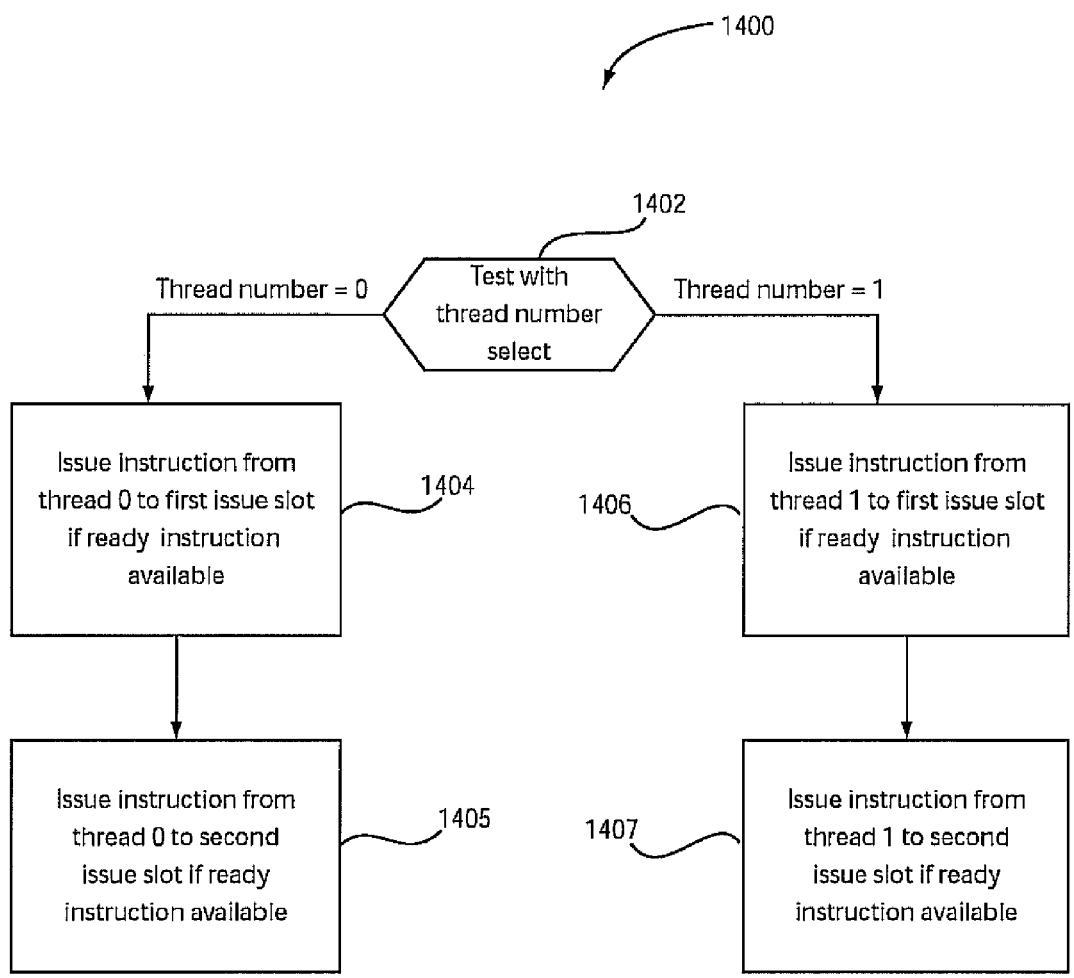
FIG. 14A shows a prior art instruction scheduling method commonly used in conjunction with the prior art register file of FIG. 4.
Figure 14B:
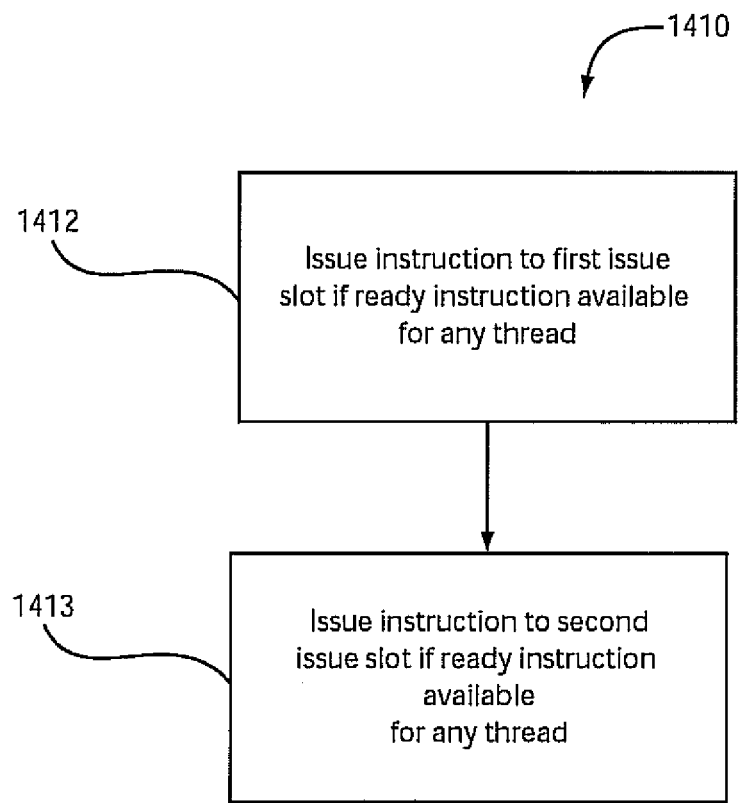
FIG. 14B shows a prior art instruction scheduling method commonly used for SMT processing in conjunction with the register file of FIG. 1A, and where instructions operands have been renamed in accordance with the method of FIG. 5B.
Figure 14C:
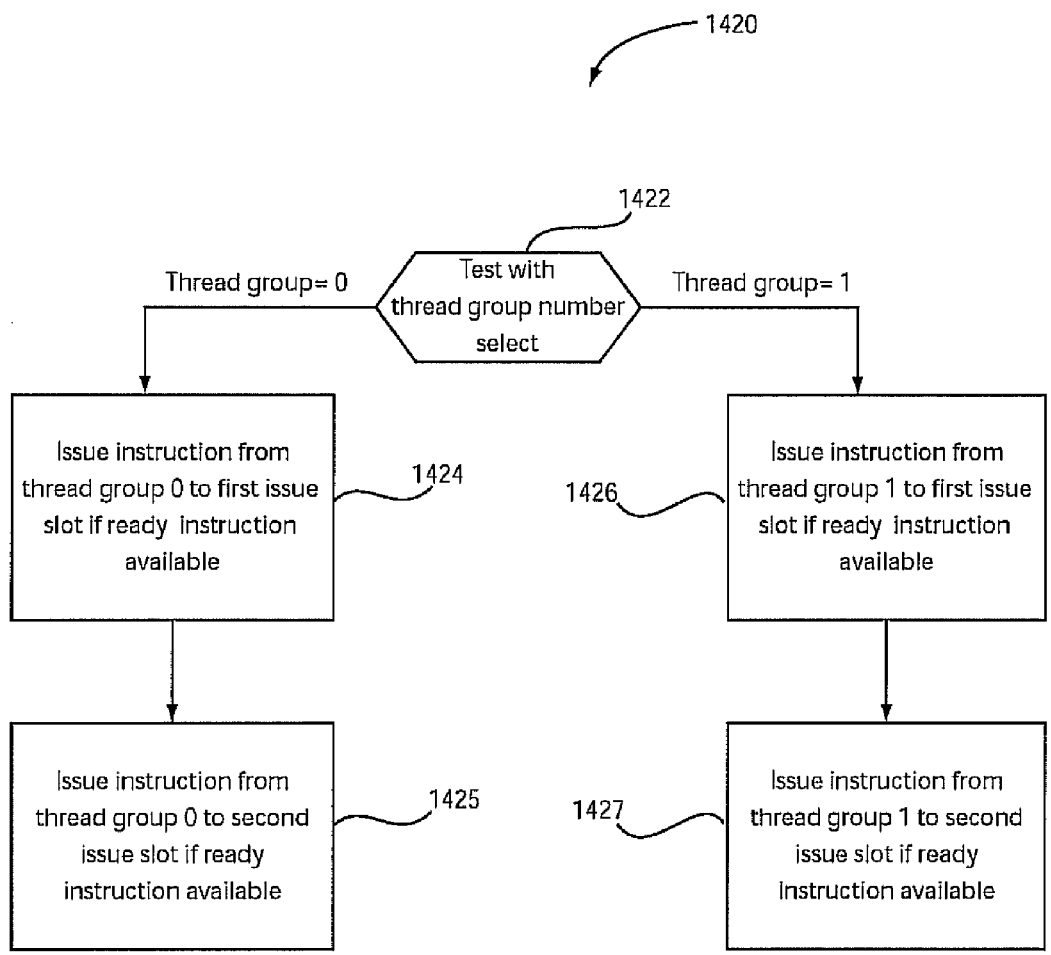
FIG. 14C an exemplary scheduling method, in accordance with an embodiment of the present principles.

Turning to FIG. 14C, an exemplary scheduling method, in accordance with an embodiment of the present principles, is indicated generally by the reference numeral 1420. Advantageously, the method 1420 may be used, but is not limited to such use, with respect to any of the rename methods of FIGS. 13A and 13B, the prior art register file of FIG. 4, and the thread-group oriented rename mapping of FIG. 10. The method 1420 advantageously allows the combination of the advantages of a register file with multiple bit cells and a large number of threads.

The method 1420 starts with step 1422. In test 1422, the thread group number tested. If the thread group number corresponds to a first thread group number, control passes to step 1424. Otherwise, control passes to step 1426.

In step 1424, a first instruction is issued corresponding to a thread in thread group 0 to a first issue slot if a ready instruction is available for any thread in thread group 0, and control is passed to step 1425.

In step 1425, a second instruction is issued corresponding to a thread in thread group 0 to a second issue slot if a ready instruction is available for any thread in thread group 0, and the method is terminated.

In step 1426, a first instruction is issued corresponding to a thread in thread group 1 to a first issue slot if a ready instruction is available for any thread in thread group 1, and control is passed to step 1427.

In step 1427, a second instruction is issued corresponding to a thread in thread group 1 to a second issue slot if a ready instruction is available for any thread in thread group 1, and the method is terminated.

Figure 14D:
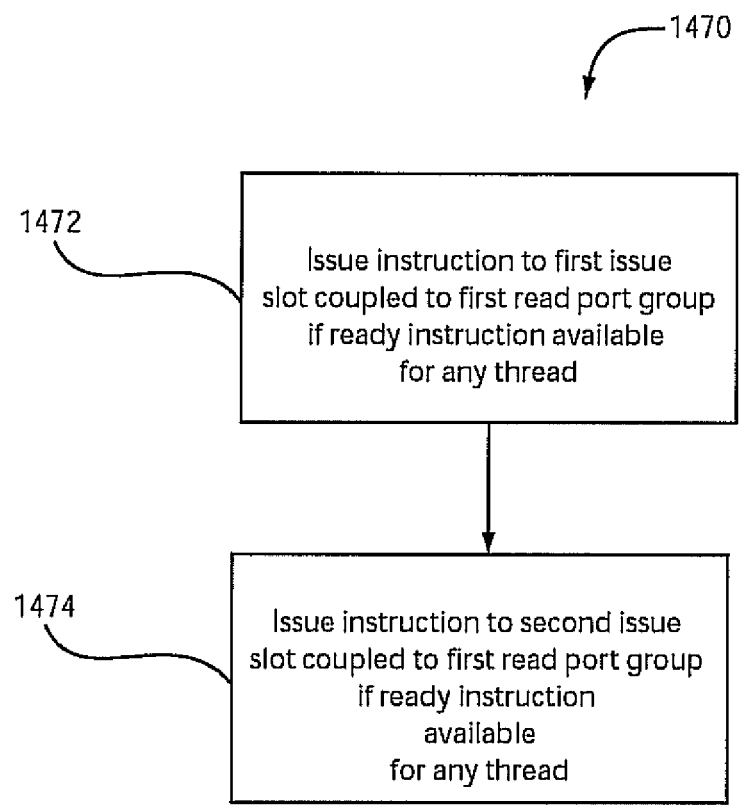
FIG. 14D another exemplary scheduling method, in accordance with an embodiment of the present principles.

Turning to FIG. 14D, another exemplary scheduling method, in accordance with an embodiment of the present principles, is indicated generally by the reference numeral 1470. Advantageously, the method 1470 may be used, but is not limited to such use, with respect to any of the rename methods of FIGS. 13A and 13B, the register file of FIG. 8, and the thread-group oriented rename mapping of FIG. 10.

The method 1470 can be practiced in conjunction with threads and thread groups. In one embodiment the method 1470 is practiced in conjunction with rename mapping logic.

The method 1470 starts with step 1472. In step 1472 a first instruction is issued to a first issue slot coupled to a first read port group if an instruction is ready for any thread, and control is passed to step 1474.

In step 1474 a second instruction is issued to a second issue slot coupled to a second read port group if an instruction is ready for any thread, and the method is terminated.

Those skilled in the art will understand that when the method 1470 of FIG. 14D is practiced in conjunction with thread numbers, thread numbers are operatively coupled to the select logic shared by the read port groups; and when the method 1470 of FIG. 14D is practiced in conjunction with thread groups, thread group numbers are operatively coupled to the select logic shared by the read port groups.

Referring now to configurable aspect, wherein the number of threads can be adapted to workload requirements, one exemplary embodiment has support for up to 4 threads, with 2 threads per thread group. The exemplary embodiment also supports configurations providing a user with only 2 threads, or with a single thread, while other threads are dormant.

In accordance with one configuration of a configurable embodiment with 4 threads, when 2 threads are dormant, both dormant threads are selected to be from the same thread group. This configuration is particularly advantageous when issue logic in accordance with method 1420 of FIG. 14C is used.

In accordance with another configuration of a configurable embodiment with 4 threads, when 2 threads are dormant, both dormant threads are selected to be from different thread groups. This configuration is particularly advantageous when issue logic in accordance with method 1470 of FIG. 14D is used.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. An apparatus for a register file, comprising:
a plurality of multi-bit storage cells for storing a plurality of bits respectively corresponding to a plurality of threads; and
a plurality of port groups, operatively coupled to said plurality of multi-bit storage cells, responsive to physical register identifiers, each port group comprising a group of ports sharing a common selection circuit such that all ports within the port group access registers from a common subset of registers;
wherein said plurality of port groups are responsive to respective ones of a plurality of thread identifiers, each of the plurality of thread identifiers for uniquely identifying a particular thread from among a plurality of threads.

2. The apparatus of claim 1, further comprising at least one thread select logic circuit operatively coupled to said plurality of port groups and being responsive to a thread select signals from said plurality of port groups.

3. The apparatus of claim 2, wherein at least one of said plurality of port groups comprises at least two ports that are responsive to a common one of the thread select signals.

4. The apparatus of claim 2, wherein each of said plurality of multi-bit storage cells is associated with a respective separate thread from among the plurality of threads, and is operatively coupled to each of said at least one thread select logic circuit.

5. The apparatus of claim 1, further comprising a plurality of thread select logic circuits, each of said plurality of thread select logic circuits operatively coupled to a respective one of said plurality of port groups and being responsive to a thread select signal from the respective one of said plurality of port groups.

6. The apparatus of claim 5, wherein at least one of said plurality of port groups comprises at least two ports that are responsive to a common respective one of said plurality of thread select logic circuits.

7. The apparatus of claim 1, wherein said at least one port group includes at least one of at least one read port group and at least one write port group.

8. The apparatus of claim 1, further comprising register rename logic, operatively coupled to said plurality of port groups, for deriving the physical register identifiers from logical register identifiers responsive to the plurality of thread identifiers.

9. An apparatus for a register file, comprising:
a plurality of multi-bit storage cells for storing multiple bits corresponding to a plurality of threads; and
at least one port group, operatively coupled to said plurality of multi-bit storage cells, responsive to physical register identifiers and respective ones of a plurality of thread group identifiers, each of the plurality of thread group identifiers for uniquely identifying a thread group from among a plurality of thread groups.

10. The apparatus of claim 9, further comprising register rename logic, operatively coupled to said at least one port group, for deriving the physical register identifiers from logical register identifiers responsive to the plurality of thread groups identifiers and a plurality of thread identifiers, each of the plurality of thread identifiers for uniquely identifying a particular one of the plurality of threads from a particular one of the plurality of thread groups when combined with a corresponding one of the plurality of thread group identifiers.

11. The apparatus of claim 10, wherein said register rename logic generates a similar range of physical register identifiers for each of a plurality of thread groups, each of the physical register identifiers uniquely identifies a group of multi-bit storage cells from among the plurality of multi-bit storage cells, and each of the plurality of thread group identifiers uniquely identifies a storage bit with the group of multi-bit storage cells.

12. The apparatus of claim 10, wherein said register rename logic derives the physical register identifiers with respect to a set of physical registers when renaming with respect to one of the plurality of thread groups, and dynamically allocates at least one specific one of the physical registers from the set to a specific one of the plurality of threads within a specific one of the plurality of thread groups based on runtime behavior.

13. The apparatus of claim 9, where each of the physical register identifiers are respectively derived by combining a respective one of a plurality of thread identifiers with a respective logical register identifier, each of the plurality of thread identifiers for uniquely identifying a particular one of the plurality of threads from a particular one of the plurality of thread groups when combined with a corresponding one of the plurality of thread group identifiers.

14. The apparatus of claim 10, further comprising at least one thread group select logic circuit, each of said at least one thread group select logic circuit operatively coupled to a respective one of said at least one port group and being responsive to a thread group select signal from the respective one of said at least one port group.

15. The apparatus of claim 14, wherein each of said at least one port group comprises a set of ports that are responsive to a common respective one of said at least one thread group select logic circuit.

16. The apparatus of claim 14, wherein each of said plurality of multi-bit storage cells is associated with a respective separate one of the plurality of thread groups, each of said plurality of multi-bit storage cells operatively coupled to each of said at least one thread group select logic circuit.

17. The apparatus of claim 10, wherein said at least one port group includes at least one of at least read port group and at least one write port group.

18. An apparatus for a register file, comprising:
a plurality of multi-bit storage cells for storing multiple bits; and
at least two port groups, coupled to said plurality of multi-bit storage cells, responsive to physical register identifiers, each of the at least two port groups having at least two ports,
wherein said at least two ports of at least one of said at least two port groups are responsive to a common selection signal indicating a selection of one bit from among multiple bits of at least one of the plurality of multi-bit storage cells.

19. The apparatus of claim 18, further comprising at least one select logic circuit, each operatively coupled to a respective one of said at least two port groups, for generating the common selection signal.

20. The apparatus of clam 18, wherein said at least one thread select circuit selects from one of a plurality of bits in at least one of the plurality of multi-bit storage cells in response to one of a thread identifier and a thread group identifier, the thread group identifier for uniquely identifying a particular thread group from among a plurality of thread groups, the thread identifier for uniquely identifying a particular thread from among a plurality of threads.

* * * * *